United States Patent
Liu et al.

(10) Patent No.: US 12,255,529 B2
(45) Date of Patent: Mar. 18, 2025

(54) POWER FACTOR CORRECTION AND DC-DC MULTIPLEXING CONVERTER AND UNINTERRUPTIBLE POWER SUPPLY INCLUDING THE SAME

(71) Applicant: LIAN ZHENG ELECTRONICS (SHENZHEN) CO., LTD., Shenzhen (CN)

(72) Inventors: Kai Liu, Shenzhen (CN); Yusong Ding, Shenzhen (CN); Zhongyong Xu, Shenzhen (CN)

(73) Assignee: Lian Zheng Electronics (Shenzhen) Co., Ltd., Shenzhen (CN)

( * ) Notice: Subject to any disclaimer, the term of this patent is extended or adjusted under 35 U.S.C. 154(b) by 249 days.

(21) Appl. No.: 18/166,091

(22) Filed: Feb. 8, 2023

(65) Prior Publication Data
US 2023/0253877 A1    Aug. 10, 2023

(30) Foreign Application Priority Data
Feb. 9, 2022 (CN) ........................ 202210121420.X

(51) Int. Cl.
*H02M 1/42* (2007.01)
(52) U.S. Cl.
CPC ....... *H02M 1/4258* (2013.01); *H02M 1/4225* (2013.01)
(58) Field of Classification Search
CPC ..................... H02M 1/4225; H02M 1/4258
USPC .......................................................... 363/16
See application file for complete search history.

(56) References Cited

U.S. PATENT DOCUMENTS

| | | | | |
|---|---|---|---|---|
| 8,942,019 | B2 * | 1/2015 | Shekhawat | H02M 7/487 363/131 |
| 9,024,476 | B2 * | 5/2015 | Ghosh | H02M 1/10 307/85 |
| 2011/0298427 | A1 * | 12/2011 | Uemura | H01M 10/66 320/134 |
| 2022/0302853 | A1 * | 9/2022 | Yang | H02M 7/5395 |

* cited by examiner

*Primary Examiner* — Yemane Mehari
(74) *Attorney, Agent, or Firm* — Stanek Lemon Crouse & Meeks, PA

(57) ABSTRACT

The present invention provides a power factor correction (PFC) and DC-DC multiplexing converter and an uninterruptible power supply including the same. The multiplexing converter includes a multiplexing bridge arm and a battery hookup bridge arm. During power supply of a battery, the converter controls one electrode of a positive electrode and a negative electrode of the battery to be alternately connected to a neutral point and one of positive and negative direct current buses that has the same polarity as the electrode, to enable a level of the electrode of the battery to synchronously and alternately rise or drop with the alternate supply of power to the positive and negative direct current buses; or controls one electrode of a positive electrode and a negative electrode of the battery to be constantly connected to the neutral point. A current converter of the present invention has less battery charge-discharge potential jumps, higher level of integration, lower costs, and better electromagnetic compatibility characteristics, and is more applicable to a single-battery uninterruptible power supply system.

16 Claims, 22 Drawing Sheets

POWER FACTOR CORRECTION AND DC-DC MULTIPLEXING CONVERTER AND UNINTERRUPTIBLE POWER SUPPLY INCLUDING THE SAME

CROSS-REFERENCE TO RELATED APPLICATIONS

The present application claims priority to Chinese Patent Application No. 202210121420.X filed on Feb. 9, 2022, entitled POWER FACTOR CORRECTION AND DC-DC MULTIPLEXING CONVERTER AND UNINTERRUPTIBLE POWER SUPPLY INCLUDING THE SAME, the disclosure of which is incorporated herein by reference in its entirety.

TECHNICAL FIELD

The present invention relates to the field of electricity and electronics, and specifically to a power factor correction (PFC) and DC-DC multiplexing converter and an uninterruptible power supply including the same.

BACKGROUND

Uninterruptible power supplies are widely used in industrial, commercial, and consumption fields because of capable of instantaneously switching to continuous power supply of batteries to the loads when the power supply of the utility power enters an abnormal state to protect loads from damage from interruptions in power supply of utility power. At present, a high profile development direction of uninterruptible power supplies is to reduce the number of batteries (for example, by designing as a single battery), reduce battery voltage, and avoid the introduction of neutral lines in battery circuits. Such uninterruptible power supplies usually include an AC-DC power factor control (PFC) circuit for converting alternating current inputted from an alternating current input terminal into direct current, a circuit for charging a battery, and a DC-DC circuit for discharging the battery. There are currently two design directions for single-battery uninterruptible power supplies in the industry. In the first design direction, the AC-DC PFC circuit and the DC-DC circuit for discharging the battery are separately designed. Obviously, an uninterruptible power supply designed in this way is bulky and costly. In the second design direction, the AC-DC PFC circuit and the DC-DC circuit for discharging the battery are multiplexed to reduce the number of power devices and reduce the size.

FIG. 1 is a schematic diagram of a multiplexing circuit 11 of an AC-DC PFC circuit and a DC-DC circuit for discharging a battery for a single-battery uninterruptible power supply commonly used in the existing technology. As shown in FIG. 1, a dual boost (BOOST) circuit topology is adopted. In a utility power mode, direct current switches K11 and K12 are opened to isolate a battery B from utility power, and power factor control is performed on alternating current utility power through pulse-width modulation of a positive side switching transistor Q11 and a negative side switching transistor Q12, thereby outputting direct current power to a positive direct current bus 101 and a negative direct current bus 102. When utility power fails and the power supply is in a battery mode, the direct current switches K11 and K12 are closed to enable the battery B to supply power to the positive direct current bus 101 and the negative direct current bus 102. In a process of supplying direct current to the positive and negative direct current buses, the positive and negative sides of the circuit topology operate alternately. For example, when charging the positive direct current bus 101, the positive side switching transistor Q11 is controlled for pulse-width modulation, and the negative side switching transistor Q12 is always on. When charging the negative direct current bus 102, the negative side switching transistor Q12 is controlled for pulse-width modulation, and the positive side switching transistor Q11 is always on. This topology design has the following drawbacks: for the single battery B, in the battery mode, lines connected to both positive and negative electrodes of the battery B have high frequency jumps in potential, and as a result the electromagnetic compatibility (EMC) is poor. Therefore, two clamping diodes D13 and D14 need to be used. After the diodes are added, two inductors L11 and L12 always have current flowing in the battery mode in the alternating operating states of the positive and negative sides.

FIG. 2 exemplarily shows a pulse-width modulation control signal and a current waveform of a corresponding device during the charging of the positive and negative sides of the circuit shown in FIG. 1. The dashed range shows the operation of the positive side. The positive side switching transistor Q11 is controlled for pulse-width modulation, and the negative side switching transistor Q12 is controlled to be on, the current on inductor L11 is a triangular-wave current, and the current on inductor L12 is an essentially constant direct current freewheeling current. It can be seen that the heating of the two inductors in the battery mode is very serious, and there is no option but to increase the sizes of the inductors, and the defect is very serious. In addition, such a dual BOOST circuit topology includes one rectifier bridge and two inductors, and the conversion efficiency in the utility power mode is not high.

SUMMARY

For the foregoing technical problems in the existing technology, in one aspect, the present invention provides a power factor correction (PFC) and DC-DC multiplexing converter, including a multiplexing bridge arm and a battery hookup bridge arm, where the multiplexing bridge arm includes:
- a first inductor, where a first terminal of the first inductor is selectively connected to utility power or a battery;
- a first switching transistor and a second switching transistor connected in reverse series between a second terminal of the first inductor and a neutral point;
- positive and negative direct current buses configured to output direct current power, and a first capacitor and a second capacitor respectively connected between the positive and negative direct current buses and the neutral point;
- a first diode and a third switching transistor, where an anode of the first diode and a first terminal of the third switching transistor are connected to the second terminal of the first inductor, and a cathode of the first diode and a second terminal of the third switching transistor are respectively connected to the positive and negative direct current buses;
- the battery hookup bridge arm is connected between the battery and the multiplexing bridge arm to control the battery to alternately supply power to the positive and negative direct current buses; and
- where the PFC and DC-DC multiplexing converter controls one electrode of a positive electrode and a negative electrode of the battery to be alternately connected to the neutral point and one of the positive and negative direct current buses that has the same polarity as the electrode, to enable a level of the electrode of the battery to synchronously and alternately rise or drop with the alternate supply of power to the positive and negative direct current buses; or controls one electrode of a positive electrode and a negative electrode of the battery to be constantly connected to the neutral point.

Preferably, in response to the battery hookup bridge arm being connected to the negative electrode of the battery and being powered by the battery, the battery hookup bridge arm alternately connects the negative electrode of the battery to the neutral point and the negative direct current bus; and in response to the battery hookup bridge arm being connected to the positive electrode of the battery and being powered by the battery, the negative electrode of the battery is directly connected to the neutral point; and the PFC and DC-DC multiplexing converter is configured such that, in a positive half cycle of power supply of the battery:

in response to the first inductor forming a direct loop with the battery through the battery hookup bridge arm, the first inductor stores energy, and in response to the first inductor forming a loop with the battery through the first capacitor and the battery hookup bridge arm, the inductor and the battery charge the first capacitor; and in a negative half cycle of power supply of the battery:

in response to the first inductor forming a direct loop with the battery through the battery hookup bridge arm, the first inductor stores energy, and in response to the first inductor forming a loop with the second capacitor and the battery through the battery hookup bridge arm, the inductor and the battery charge the second capacitor, or in response to the first inductor only forming a loop with the second capacitor through the battery hookup bridge arm, the inductor charges the second capacitor.

Preferably, the battery hookup bridge arm includes:

a second diode and a fourth switching transistor, where an anode of the second diode is connected to the negative direct current bus, and a cathode of the second diode is connected to the negative electrode of the battery; and a first terminal of the fourth switching transistor is connected to the neutral point, and a second terminal of the fourth switching transistor is connected to a node formed between the cathode of the second diode and the negative electrode of the battery.

Preferably, the converter is configured such that:

in the positive half cycle of power supply of the battery, one switching transistor of the first switching transistor and the second switching transistor that has a current conduction direction the same as a current direction in the multiplexing bridge arm performs pulse width modulation to make the first inductor store energy or charge the first capacitor, and the fourth switching transistor connects the negative electrode of the battery to the neutral point; and in the negative half cycle of power supply of the battery, the third switching transistor performs pulse width modulation to make the first inductor store energy or charge the second capacitor, and the second diode connects the negative electrode of the battery to the negative direct current bus.

Preferably, a first terminal of the first switching transistor is connected to a first terminal of the second switching transistor, a second terminal of the first switching transistor is connected to the second terminal of the first inductor, and a second terminal of the second switching transistor is connected to the neutral point, where the second switching transistor performs the pulse width modulation in the positive half cycle of power supply of the battery.

Preferably, in the multiplexing bridge arm, a second terminal of the first switching transistor is connected to a second terminal of the second switching transistor, a first terminal of the first switching transistor is connected to the second terminal of the first inductor, and a first terminal of the second switching transistor is connected to the neutral point; and the third switching transistor is replaced with a third diode, a cathode of the third diode is connected to the anode of the first diode, and an anode of the third diode is connected to the negative direct current bus.

Preferably, the battery hookup bridge arm includes:

a fifth switching transistor and a sixth switching transistor, where a first terminal of the fifth switching transistor is connected to a node formed between the second terminal of the first switching transistor and the second terminal of the second switching transistor, and a second terminal of the fifth switching transistor is connected to the negative electrode of the battery; and a first terminal of the sixth switching transistor is connected to a node between the negative electrode of the battery and the second terminal of the fifth switching transistor, and a second terminal of the sixth switching transistor is connected to the negative direct current bus.

Preferably, the converter is configured such that:

in the positive half cycle of power supply of the battery, the first switching transistor performs pulse width modulation to make the first inductor store energy or charge the first capacitor, and the second switching transistor and the fifth switching transistor connect the negative electrode of the battery to the neutral point; and in the negative half cycle of power supply of the battery, the fifth switching transistor performs pulse width modulation to make the first inductor store energy or charge the second capacitor, and the sixth switching transistor connects the negative electrode of the battery to the negative direct current bus.

Preferably, in the multiplexing bridge arm, the third switching transistor is replaced with a fourth diode, a cathode of the fourth diode is connected to the anode of the first diode, and an anode of the fourth diode is connected to the negative direct current bus; and the battery hookup bridge arm includes: a seventh switching transistor and a fifth diode, where a first terminal of the seventh switching transistor is connected to the positive electrode of the battery, a second terminal of the seventh switching transistor is connected to the first inductor, the seventh switching transistor is controlled by a control terminal of the seventh switching transistor to enable a current to flow from the first terminal of the seventh switching transistor to the second terminal or to be cut off; and the seventh switching transistor is connected with a diode in reverse parallel from the first terminal to the second terminal;

a cathode of the fifth diode is connected to a node formed between the second terminal of the seventh switching transistor and the first inductor, and an anode of the fifth diode is connected to the negative direct current bus; and the negative electrode of the battery is connected to the neutral point.

Preferably, the converter is configured such that:

in the positive half cycle of power supply of the battery, one switching transistor of the first switching transistor and the second switching transistor that has a current conduction direction the same as a current direction in the multiplexing bridge arm performs pulse width modulation to make the first inductor store energy or charge the first capacitor; and in the negative half cycle of power supply of the battery, the seventh switching transistor performs pulse width modulation to make the first inductor store energy or charge the second capacitor.

Preferably, each of the first switching transistor to the seventh switching transistor is controlled by a control terminal of the switching transistor to enable a current to flow from the first terminal of the switching transistor to the second terminal or to be cut off; and each of the first switching transistor to the seventh switching transistor is connected with a diode in reverse parallel from the first terminal to the second terminal.

Preferably, the first switching transistor to the seventh switching transistor are insulated gate bipolar transistors, the first terminal of the switching transistor is a collector, and the second terminal of the switching transistor is an emitter.

Preferably, the battery hookup bridge arm is alternatively connected to the positive direct current bus from the negative direct current bus in a mirrored manner by the battery hookup bridge arm of any one of claims 1 to 10, where in response to the battery hookup bridge arm being connected to the positive electrode of the battery and being powered by the battery, the battery hookup bridge arm alternately connects the positive electrode of the battery to the neutral point and the positive direct current bus; or in response to the battery hookup bridge arm being connected to the negative electrode of the battery and being powered by the battery, the positive electrode of the battery is directly connected to the neutral point.

Preferably, at least one of the first switching transistor to the seventh switching transistor is a metal-oxide-semiconductor field effect transistor or a thyristor.

In another aspect, the present invention provides an uninterruptible power supply, including:

the PFC and DC-DC multiplexing converter in any item of the one aspect of the present invention, where the battery is a single rechargeable battery; and a control module, configured to control on/off states the first switching transistor to the seventh switching transistor.

Preferably, the uninterruptible power supply is configured such that: in a first polarity half cycle of power supply of utility power, the multiplexing bridge arm performs power factor correction and rectification on alternating current inputted from utility power and charges a first polarity direct current bus; and in a second polarity half cycle of power supply of utility power, the multiplexing bridge arm performs power factor correction and rectification on the alternating current inputted from utility power and charges a second polarity direct current bus; and in a first polarity half cycle of power supply of a rechargeable single battery, the multiplexing bridge arm boosts voltage of direct current inputted from the rechargeable single battery to charge the first polarity direct current bus, and a second polarity terminal of the rechargeable single battery is in communication with the neutral point; and in a second polarity half cycle of power supply of the rechargeable single battery, the multiplexing bridge arm boosts voltage of the direct current inputted from the rechargeable single battery to charge the second polarity direct current bus, and the second polarity terminal of the battery is in communication with the second polarity direct current bus; or, the second polarity terminal of the battery is communication with the neutral point in both the first polarity half cycle and the second polarity half cycle.

A current converter and an uninterruptible power supply including the same of the present invention adopt a multiplexing circuit design in which battery charge-discharge potentials have less jumps, have higher level of integration, lower costs, better electromagnetic compatibility characteristics, and are more applicable to a single-battery uninterruptible power supply system.

BRIEF DESCRIPTION OF THE DRAWINGS

Embodiments of the present invention are further described below with reference to the accompanying drawings, in which.

DETAILED DESCRIPTION

To make the objectives, technical schemes, and advantages of the present invention more comprehensible, the present invention is further described below in detail with reference to the accompanying drawings and specific embodiments. The following exemplarily show a multiplexing conversion circuit of various AC-DC power factor correction (PFC) circuits and DC-DC circuits for discharging batteries (referred to as a PFC and DC-DC multiplexing circuit for short) and various preferred embodiments of a single-battery uninterruptible power supply including the multiplexing conversion circuit.

It should be noted that a control module that applies a control signal to a gate of a switching transistor to perform pulse width modulation is not described in detail in the various embodiments of the present invention to maintain focus in the description. Based on the teachings herein, those having ordinary skill in the art will readily understand how to implement the control module.

Embodiment One

Figure 3:
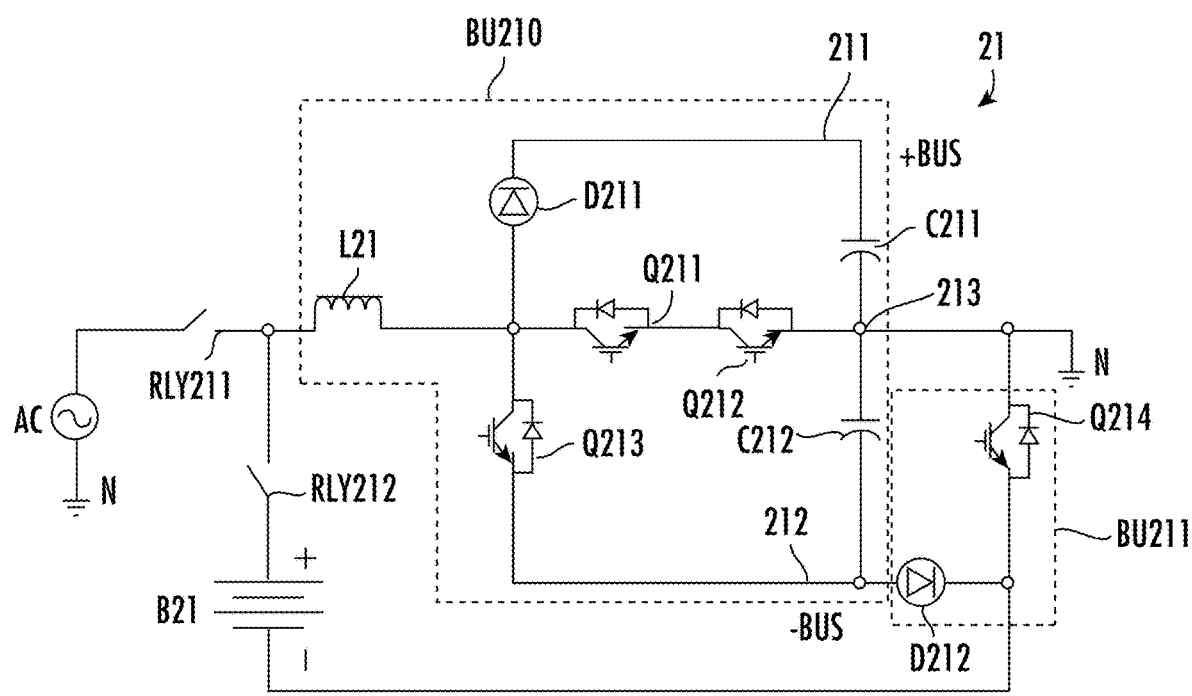
FIG. 3 is a schematic diagram of a PFC and DC-DC multiplexing circuit of an uninterruptible power supply being connected to a single-phase alternating current power supply AC or a battery according to a preferred embodiment of this application.

FIG. 3 is a schematic diagram of a PFC and DC-DC multiplexing circuit (multiplexing converter) of an uninterruptible power supply being connected to a single-phase alternating current power supply AC or a battery B21 according to a preferred embodiment of this application. A PFC and DC-DC multiplexing circuit 21 mainly includes a multiplexing bridge arm unit BU210 and a battery hookup bridge arm unit BU211.

The multiplexing bridge arm unit BU210 is configured to rectify alternating current outputted from utility power in a utility power mode and perform power factor correction, or convert direct current outputted by a battery in a battery mode, and includes an inductor L21, a switching transistor Q211 and a switching transistor Q212 (connected in reverse series with the switching transistor Q211) which are connected in series in sequence, as well as a diode D211, a switching transistor Q213, and direct current bus capacitors C211 and C212. The switching transistors are shown as insulated gate bipolar transistors connected with a diode in reverse parallel in all embodiments of this application, but may be alternatively other appropriate transistors connected with a diode in reverse parallel.

One terminal of the inductor L21 is connected to an emitter of the switching transistor Q211, and the other terminal of the inductor L21 is connected to single-phase alternating current AC by an alternating current switch RLY211 and is connected to a positive electrode of the battery B21 by a direct current switch RLY212.

A collector of the switching transistor Q211 is connected to a collector of the switching transistor Q212. An emitter of the switching transistor Q212 is connected to a node 213 formed between one terminal of the direct current bus capacitor C211 and one terminal of the direct current bus capacitor C212 and is connected to a neutral point N, the other terminal of the capacitor C211 is connected to a positive direct current bus 211 used as an output, and the other terminal of the capacitor C212 is connected to a negative direct current bus 212 used as another output.

An anode of the diode D211 is connected to the emitter of the switching transistor Q211, and a cathode of the diode D211 is connected to the positive direct current bus 211. A collector of the switching transistor Q213 is connected to the anode of the diode D211, and an emitter of the switching transistor Q213 is connected to the negative direct current bus 212.

The multiplexing circuit 21 further includes the battery hookup bridge arm unit BU211 which includes a switching transistor Q214 and a diode D212. A collector of the switching transistor Q214 is connected to the node 213 and is connected to the neutral point N, and an emitter of the switching transistor Q214 is connected to a negative electrode of the battery B21. The diode D212 is connected in series between the emitter of the switching transistor Q214 and the negative direct current bus 212, a positive electrode of the diode D212 is connected to the negative direct current bus 212, and a negative electrode of the diode D212 is connected to a node formed by a connection between the emitter of the switching transistor Q214 and the negative electrode of the battery. When a charging circuit corresponding to an output terminal of the multiplexing circuit 21 has low power, the diode D212 may be used as shown in this embodiment. In other embodiments, if the charging circuit has high power, the diode D212 may be removed.

An operating status of the PFC and DC-DC multiplexing circuit 21 is described below in detail.

In the utility power mode, the alternating current switch RLY211 is closed (turned on), and the direct current switch RLY212 is opened (turned off). The switching transistor Q212 and the switching transistor Q211 are respectively controlled for pulse width modulation in positive and negative half cycles and remain in an on state during non-pulse width modulation, and the switching transistors Q213 and Q214 remain in an off state. In an alternating current positive half cycle, the switching transistor Q211 remains in an on state. When the switching transistor Q212 is turned on by pulse width modulation, a current direction is as follows: an AC power supply→the inductor L21→the switching transistor Q211→the switching transistor Q212→the neutral point N, where the inductor L21 stores energy. When the switching transistor Q212 is turned off by pulse width modulation, the current direction is as follows: the AC power supply→the inductor L21→the diode D211→the capacitor C211→the neutral point N. The AC power supply and the inductor L21 are connected in series to boost voltage and supply power to the positive direct current bus 211. In an alternating current negative half cycle, the switching transistor Q212 remains in an on state. When the switching transistor Q211 is turned on by pulse width modulation, the current direction is as follows: the neutral point N→the switching transistor Q212→the switching transistor Q211→the inductor L21→the AC power supply, where the inductor L21 stores energy. When the switching transistor Q211 is turned off by pulse width modulation, the current direction is as follows: the neutral point N→the capacitor C212→the switching transistor Q213→the inductor L21→the AC power supply. The AC power supply and the inductor L21 are connected in series to boost voltage and supply power to the negative direct current bus 211.

When utility power fails, the system is switched to the battery mode. In this case, the alternating current switch RLY211 is opened (turned off), and the direct current switch RLY212 is closed (turned on).

Figure 4A:
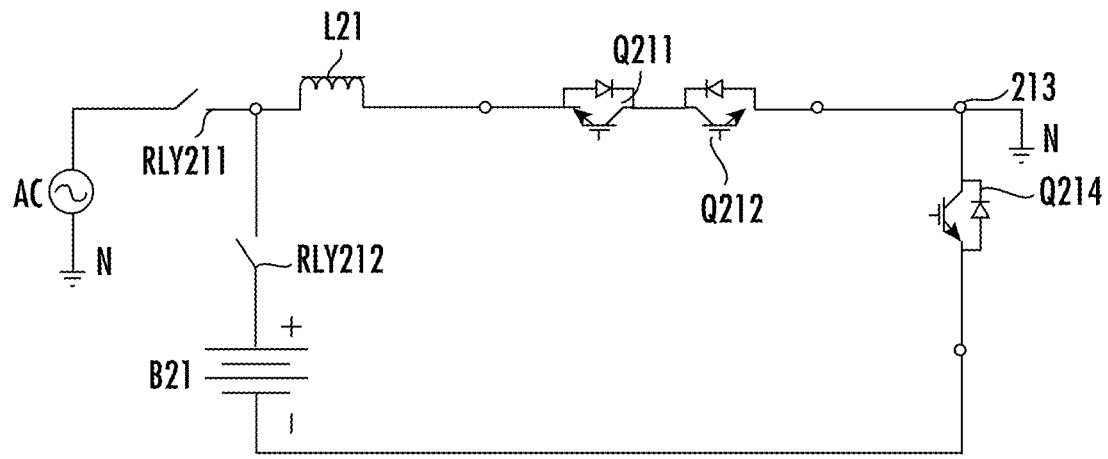
FIG. 4a and FIG. 4b are respectively schematic diagrams of equivalent circuits corresponding to a process in which a battery stores energy in an inductor (FIG. 4a) and a process in which the inductor charges a positive direct current bus (FIG. 4b) in a positive half cycle of a battery mode in the embodiment shown in FIG. 3.
Figure 4B:
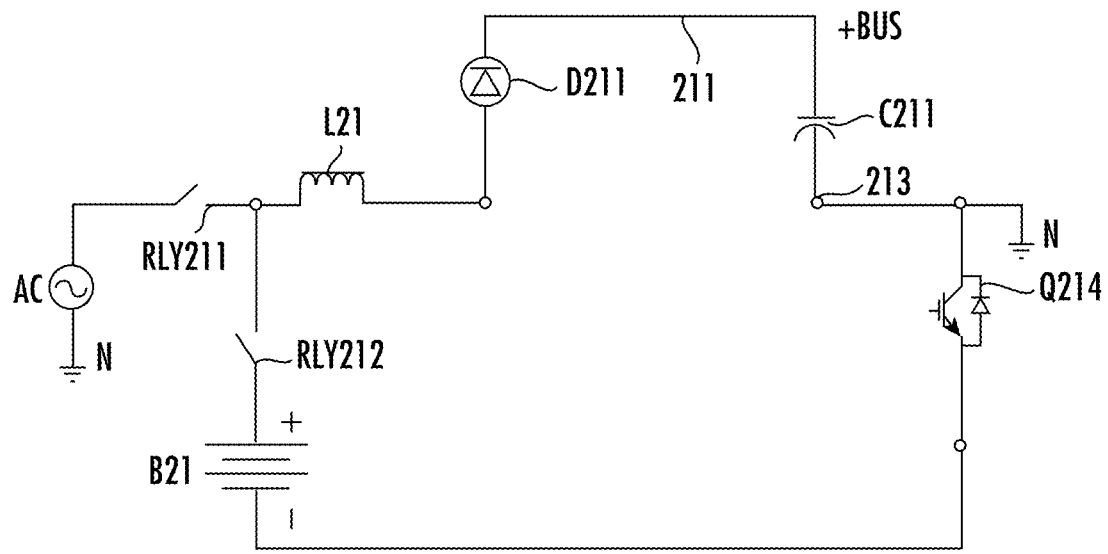

FIG. 4a and FIG. 4b are respectively schematic diagrams of equivalent circuits corresponding to a process in which a battery stores energy in an inductor (FIG. 4a) and a process in which the inductor charges a positive direct current bus (FIG. 4b) in the foregoing positive half cycle of a battery mode in the embodiment shown in FIG. 3. In a process in which the battery B21 charges the positive side direct current bus 211 (a positive half cycle), the switching transistor Q211 and the switching transistor Q214 remain on, the switching transistor Q213 remains off, and the switching transistor Q212 is controlled to perform PFC pulse width modulation. When the switching transistor Q212 is turned on, the current direction is as follows: the positive electrode of the battery B21→the inductor L21→the switching transistor Q211→the switching transistor Q212→the switching transistor Q214→the negative electrode of the battery B21, where the battery B21 stores energy in the inductor L21.

When the switching transistor Q212 is turned off, the current direction is as follows: the positive electrode of the battery B21→the inductor L21→the diode D211→the capacitor C211→the switching transistor Q214→the negative electrode of the battery B21. The battery B21 is connected in series to the inductor L21 to boost voltage and charge the positive direct current bus 211.

As can be seen, in a process of charging the positive side positive direct current bus 211, the negative electrode of the battery B21 is connected to the neutral point N by the switching transistor Q214 that is turned on. Therefore, a potential of the negative electrode of the battery B21 remains a potential of the neutral point N.

Figure 5A:
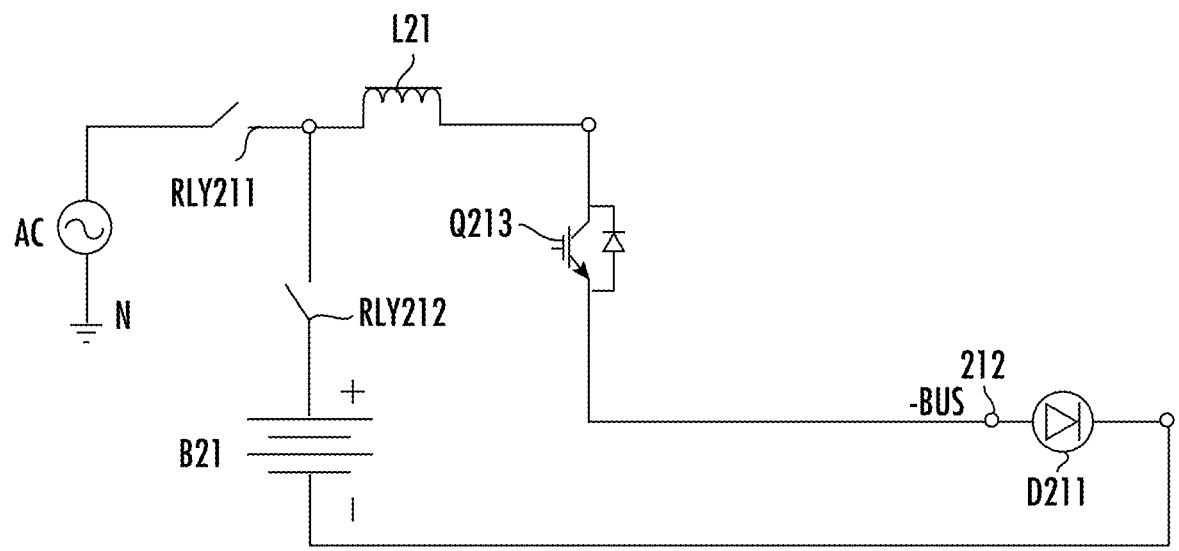
FIG. 5a and FIG. 5b are respectively schematic diagrams of equivalent circuits corresponding to a process in which a battery stores energy in an inductor (FIG. 5a) and a process in which the inductor charges a negative direct current bus (FIG. 5b) in a negative half cycle of a battery mode in the embodiment shown in FIG. 3.
Figure 5B:
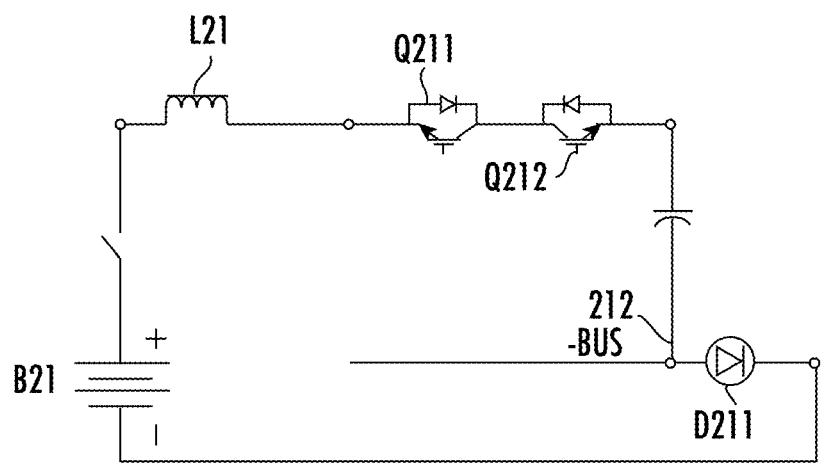

FIG. 5a and FIG. 5b are respectively schematic diagrams of equivalent circuits corresponding to a process in which a battery stores energy in an inductor (FIG. 5a) and a process in which the inductor charges a negative direct current bus (FIG. 5b) in a negative half cycle of the foregoing battery mode in the embodiment shown in FIG. 3. In a process in which the battery B21 charges the negative side direct current bus 212 (a negative half cycle), the switching transistor Q212 remains on, the switching transistor Q211 and the switching transistor Q214 remain off, and the switching transistor Q213 performs PFC pulse width modulation.

When the switching transistor Q213 is turned on, the current direction is as follows: the positive electrode of the battery B21→the inductor L21→the switching transistor Q213→the diode D212→the negative electrode of the battery B21, where the battery B21 charges the inductor L21. When the switching transistor Q213 is turned off, the current direction is as follows: the positive electrode of the battery B21→the inductor L21→the switching transistor Q211→the switching transistor Q212→the capacitor C212→the diode D212→the negative electrode of the battery B21.

As can be seen, in the process of charging the negative side negative direct current bus 212, the potential of the negative electrode of the battery B21 remains consistent with a potential of the negative direct current bus 212.

In summary, because a frequency at which the battery B21 alternately charges the positive and negative side direct current buses is a low power frequency, for example, is consistent with or in the same order of magnitude as an alternating current frequency, a jump frequency between a level of the negative electrode of the battery at the neutral point N and a level of the negative direct current bus 212 is also very low, for example, is greatly reduced relative to a switching frequency of pulse width modulation of the switching transistor Q212 or the switching transistor Q213. Because a voltage difference between the positive and negative direct current buses is constant, the positive electrode of the battery also jumps with a similar level difference value and frequency. The PFC and DC-DC multiplexing circuit 21 has a better electromagnetic compatibility characteristic.

Embodiment Two

Figure 6:
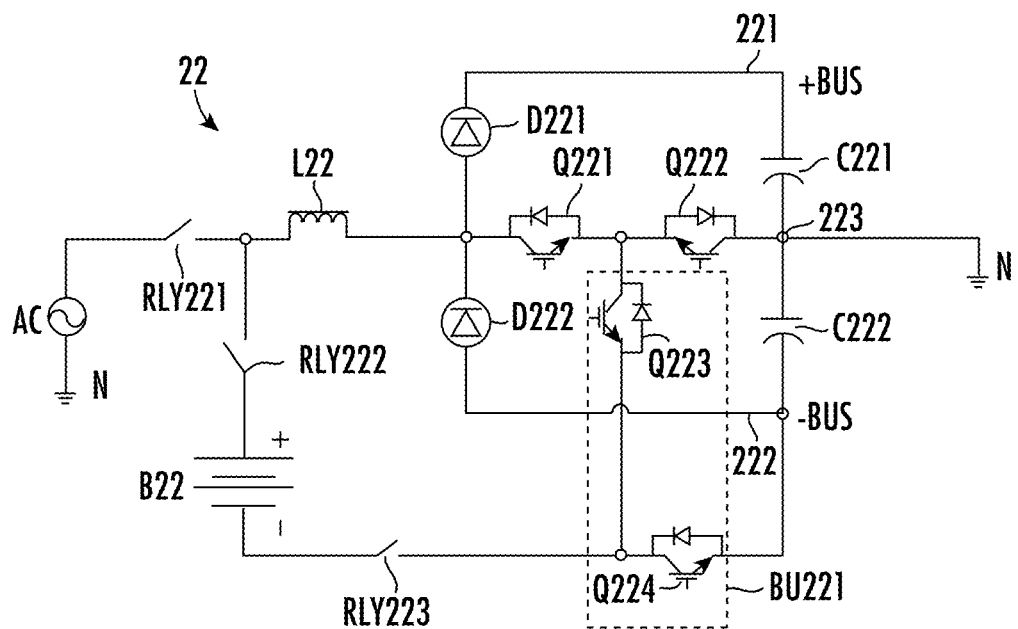
FIG. 6 is a schematic diagram of a PFC and DC-DC multiplexing circuit of an uninterruptible power supply being connected to a single-phase alternating current power supply AC or a battery according to another preferred embodiment of this application.

FIG. 6 is a schematic diagram of a PFC and DC-DC multiplexing circuit of an uninterruptible power supply being connected to a single-phase alternating current power supply AC or a battery B22 according to another preferred embodiment of this application.

A PFC and DC-DC multiplexing circuit 22 mainly includes a multiplexing bridge arm unit BU220 and a battery hookup bridge arm unit BU221. The multiplexing bridge arm unit BU220 includes an inductor L22, a switching transistor Q221 and a switching transistor Q222 (connected in reverse series with the switching transistor Q221) which are connected in series in sequence, as well as a diode D221, a diode D222, and direct current bus capacitors C221 and C222. A difference between the multiplexing bridge arm unit BU220 and the multiplexing bridge arm unit BU210 lies in that the switching transistor Q213 is replaced with the diode D222.

One terminal of the inductor L22 is connected to a collector of the switching transistor Q221, and the other terminal of the inductor L22 is connected to single-phase alternating current AC by an alternating current switch RLY221 and is connected to a positive electrode of the battery B22 by a direct current switch RLY222.

An emitter of the switching transistor Q221 is connected to an emitter of the switching transistor Q222. A collector of the switching transistor Q222 is connected to a node 223 formed between one terminal of the direct current bus capacitor C221 and one terminal of the direct current bus capacitor C222 and is connected to a neutral point N, the other terminal of the capacitor C221 is connected to a positive direct current bus 221, and the other terminal of the capacitor C222 is connected to a negative direct current bus 222.

An anode of the diode D221 is connected to a collector of the switching transistor Q221, and a cathode of the diode D221 is connected to the positive direct current bus 221. A cathode of the diode D222 is connected to the anode of the diode D221, and an anode of the diode D222 is connected to the negative direct current bus 222.

The battery hookup bridge arm unit BU221 of the multiplexing circuit 22 includes a switching transistor Q223 and a switching transistor Q224. A collector of the switching transistor Q223 is connected to the respective emitters of the switching transistor Q221 and the switching transistor Q222, and an emitter of the switching transistor Q223 is connected to a negative electrode of the battery B22 by a direct current switch RLY223. An emitter of the switching transistor Q224 is connected to the negative direct current bus 222, and a collector of the switching transistor Q224 is connected to a node between the emitter of the switching transistor Q223 and the direct current switch RLY223. The switching transistor Q221, the switching transistor Q222, the switching transistor Q223, and the switching transistor Q224 are all insulated gate bipolar transistors connected with a diode in reverse parallel.

An operating status of the PFC and DC-DC multiplexing circuit 22 is described below in detail.

In the utility power mode, the alternating current switch RLY221 is closed (turned on), the direct current switch RLY222 is opened (turned off), and the switching transistor Q223 and the switching transistor Q224 remain off. In this case, the operating status of the multiplexing circuit 22 is similar to that in the utility power mode of the multiplexing circuit 21 in Embodiment one above. In an alternating current positive half cycle of the AC power supply, the switching transistor Q222 remains on, and the switching transistor Q221 performs pulse width modulation. When the switching transistor Q221 is turned on, a current direction is as follows: the AC power supply→the inductor L22→the switching transistor Q221→the switching transistor Q222→the neutral point N, where the inductor L22 stores energy. When the switching transistor Q221 is turned off, the current direction is as follows: the AC power supply→the inductor L22→the diode D221→the capacitor C221→the neutral point N. The AC power supply and the inductor L22 are connected in series to boost voltage and supply power to the positive direct current bus 221. In an alternating current negative half cycle of the AC power supply, the switching transistor Q221 remains on, and the switching transistor Q222 performs pulse width modulation. When the switching transistor Q222 is turned on, the current direction is as follows: the neutral point N→the switching transistor Q222→the switching transistor Q221→the inductor L22→the AC power supply, where the inductor L22 stores energy. When the switching transistor Q222 is turned off, the current direction is as follows: the neutral point N→the capacitor C222→the diode D222→the inductor L22→the AC power supply. The AC power supply and the inductor L22 are connected in series to boost voltage and supply power to the negative direct current bus 221.

When utility power fails, the system is switched to the battery mode. In this case, the alternating current switch RLY221 is opened (turned off), and the direct current switches RLY222 and RLY223 are closed (turned on).

Figure 7A:
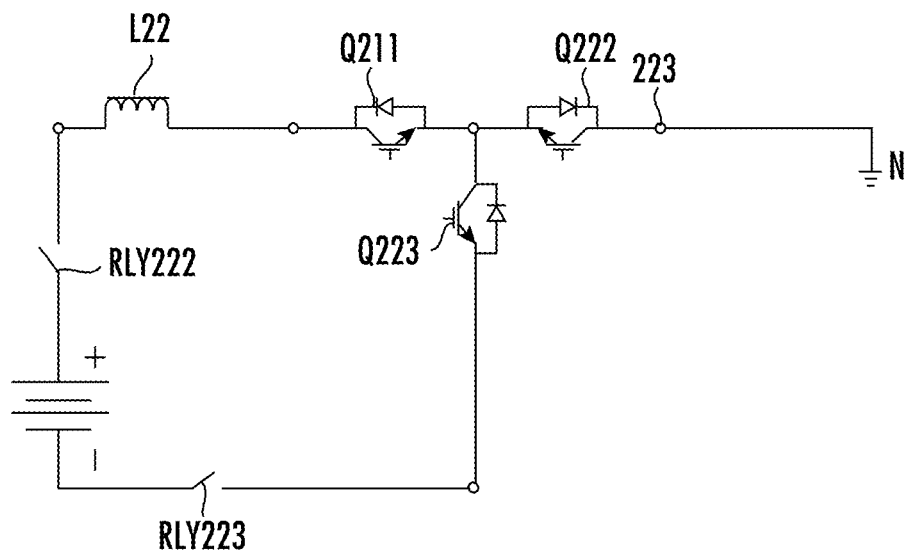
FIG. 7a and FIG. 7b are respectively schematic diagrams of equivalent circuits corresponding to a process in which a battery stores energy in an inductor (FIG. 7a) and a process in which the inductor charges a positive direct current bus (FIG. 7b) in a positive half cycle of the foregoing battery mode in the embodiment shown in FIG. 6.
Figure 7B:
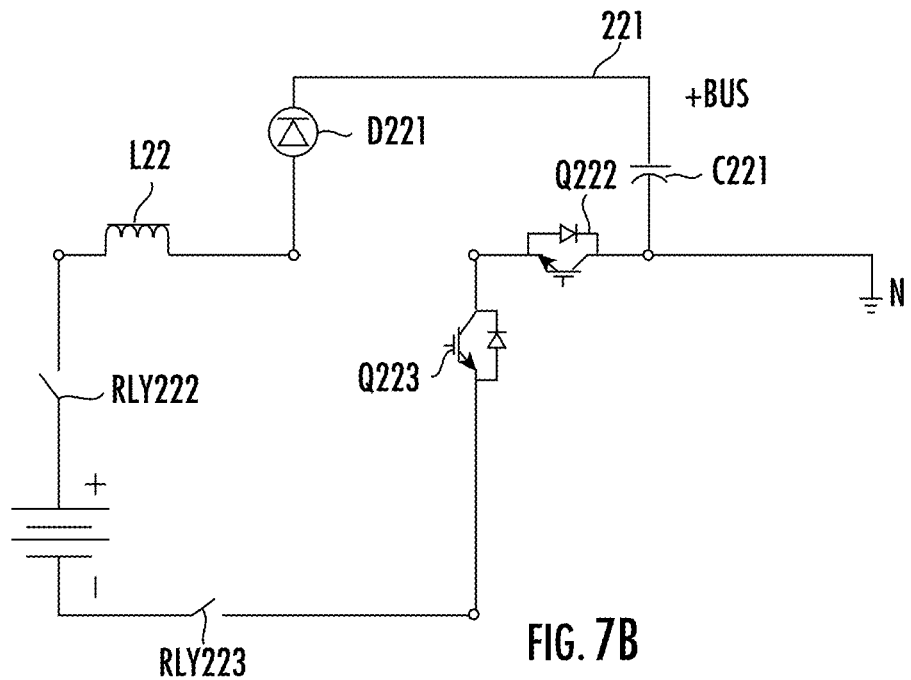

FIG. 7a and FIG. 7b are respectively schematic diagrams of equivalent circuits corresponding to a process in which a battery stores energy in an inductor (FIG. 7a) and a process in which the inductor charges a positive direct current bus (FIG. 7b) in a positive half cycle of the foregoing battery mode in the embodiment shown in FIG. 6. In a process in which the battery B22 charges the positive side direct current bus 221 (the positive half cycle), the switching transistor Q222 and the switching transistor Q223 remain on, the switching transistor Q224 remains off, and the switching transistor Q221 is controlled to perform pulse width modulation. When the switching transistor Q221 is turned on, the current direction is as follows: the positive electrode of the battery B22→the inductor L22→the switching transistor Q221→the switching transistor Q223→the negative electrode of the battery B22, where the battery B22 stores energy in the inductor L22. When the switching transistor Q221 is turned off, the current direction is as follows: the positive electrode of the battery B22→the inductor L22→the diode D221→the capacitor C221→the switching transistor Q222→the switching transistor Q223→the negative electrode of the battery B22. The battery B22 and the inductor L22 are connected in series to boosts voltage and charge the positive direct current bus 221.

As can be seen, in a process of charging the positive side positive direct current bus 221, the negative electrode of the battery B22 is connected to the neutral point N by the switching transistor Q223 and the switching transistor Q222 that are turned on. Therefore, a potential of the negative electrode of the battery B22 remains a potential of the neutral point N.

Figure 8A:
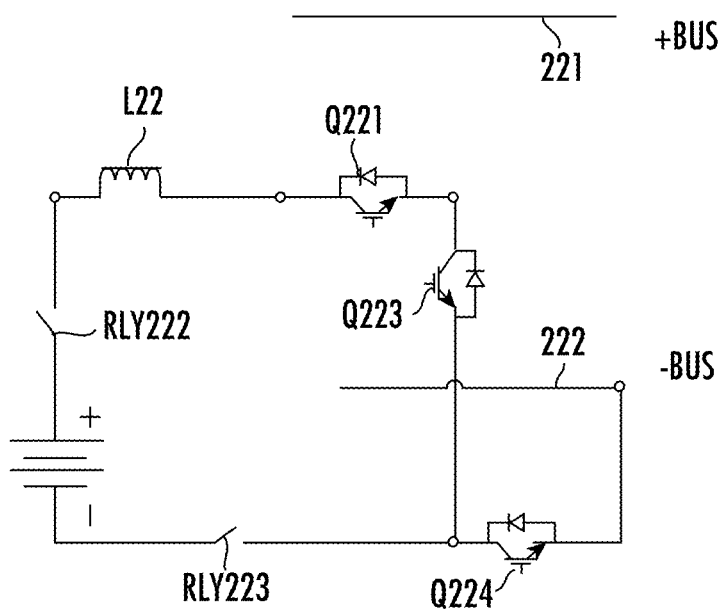
FIG. 8a and FIG. 8b are respectively schematic diagrams of equivalent circuits corresponding to a process in which a battery stores energy in an inductor (FIG. 8a) and a process in which the inductor charges a negative direct current bus (FIG. 8b) in a negative half cycle of the foregoing battery mode in the embodiment shown in FIG. 6.
Figure 8B:
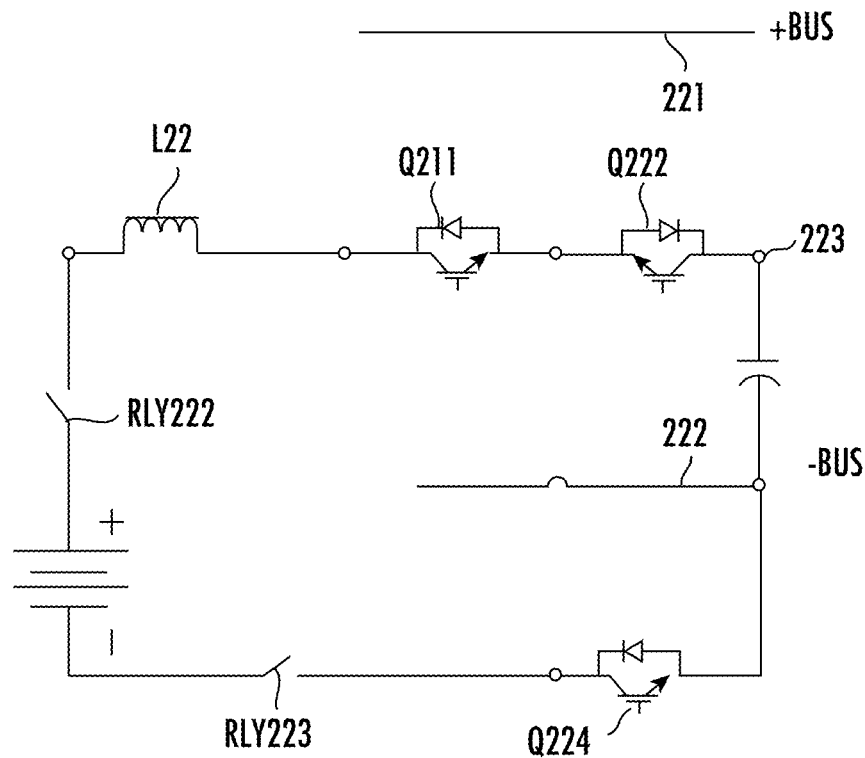

FIG. 8a and FIG. 8b are respectively schematic diagrams of equivalent circuits corresponding to a process in which a battery stores energy in an inductor (FIG. 8a) and a process in which the inductor charges a negative direct current bus (FIG. 8b) in a negative half cycle of the foregoing battery mode in the embodiment shown in FIG. 6. Similarly, in a process in which the battery B22 charges the negative side direct current bus 222 (the negative half cycle), the switching transistor Q221 and the switching transistor Q224 remain on, the switching transistor Q222 remains off, and the switching transistor Q223 performs pulse width modulation.

When the switching transistor Q223 is turned on, the current direction is as follows: the positive electrode of the battery B22→the inductor L22→the switching transistor Q221→the switching transistor Q223→the negative electrode of the battery B22, where the battery B22 charges the inductor L22. When the switching transistor Q223 is turned off, the current direction is as follows: the positive electrode of the battery B22→the inductor L22→the switching transistor Q221→the switching transistor Q222→the capacitor C222→the switching transistor Q224→the negative electrode of the battery B21.

In a process of charging the negative side negative direct current bus 222, the negative electrode of the battery B22 remains connected to the negative direct current bus 222 by the switching transistor Q224 that is turned on. Therefore, a potential of the negative electrode of the battery B22 remains consistent with a potential of the negative direct current bus 222.

In summary, because a frequency at which the battery B22 alternately charges the positive and negative side direct current buses is a low power frequency, for example, is consistent with or in the same order of magnitude as an alternating current frequency, a jump frequency between a level of the negative electrode of the battery at the neutral point N and a level of the negative direct current bus 222 is the power frequency, is greatly reduced relative to a switching frequency of pulse width modulation of the switching transistor Q221 or the switching transistor Q223.

Embodiment Three

Figure 9:
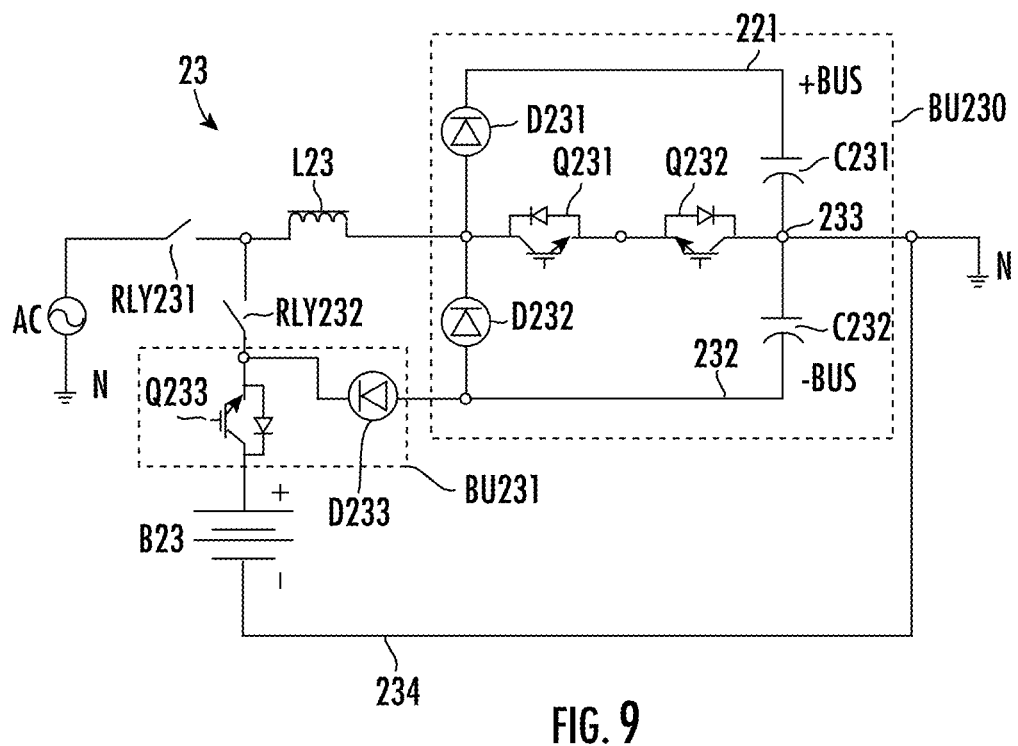
FIG. 9 is a schematic diagram of a PFC and DC-DC multiplexing circuit of an uninterruptible power supply being connected to a single-phase alternating current power supply AC or a battery according to another preferred embodiment of this application.

FIG. 9 is a schematic diagram of a PFC and DC-DC multiplexing circuit of an uninterruptible power supply being connected to a single-phase alternating current power supply AC or a battery B23 according to another preferred embodiment of this application.

A PFC and DC-DC multiplexing circuit 23 includes a multiplexing bridge arm unit BU230 and a battery hookup bridge arm unit BU231.

The multiplexing bridge arm unit BU230 includes an inductor L23, a switching transistor Q231 and a switching transistor Q232 (connected in reverse series with the switching transistor Q231) which are connected in series in sequence, as well as a diode D231, a diode D232, and direct current bus capacitors C231 and C232. The multiplexing bridge arm unit BU230 has a similar structure to the multiplexing bridge arm unit BU220.

One terminal of the inductor L23 is connected to a collector of the switching transistor Q231, and the other terminal of the inductor L23 is connected to single-phase alternating current AC by an alternating current switch RLY231 and is connected to a positive electrode of the battery B23 by a direct current switch RLY232.

An emitter of the switching transistor Q231 is connected to an emitter of the switching transistor Q232. A collector of the switching transistor Q232 is connected to a node 233 formed between one terminal of the direct current bus capacitor C231 and one terminal of the direct current bus capacitor C232 and is connected to a neutral point N, the other terminal of the capacitor C231 is connected to a positive direct current bus 231, and the other terminal of the capacitor C232 is connected to a negative direct current bus 232.

An anode of the diode D231 is connected to a collector of the switching transistor Q231, and a cathode of the diode D231 is connected to the positive direct current bus 231. A cathode of the diode D232 is connected to the anode of the diode D231, and an anode of the diode D232 is connected to the negative direct current bus 232.

The battery hookup bridge arm unit BU231 of the multiplexing circuit 23 includes a switching transistor Q233 and a diode D233. A collector of the switching transistor Q233 is connected to the positive electrode of the battery B23, and an emitter of the switching transistor Q233 is connected to the direct current switch RLY232. A cathode of the diode D233 is connected to a node formed between the emitter of the switching transistor Q233 and the direct current switch RLY232, and an anode of the diode D233 is connected to the negative direct current bus 232. The negative electrode of the battery is connected to the neutral point N by a conducting wire 234. The switching transistor Q231, the switching transistor Q232, and the switching transistor Q233 are all insulated gate bipolar transistors connected with a diode in reverse parallel.

An operating status of the PFC and DC-DC multiplexing circuit 23 is described below in detail.

In a utility power mode, the alternating current switch RLY231 is closed (turned on), and the switching transistor Q233 remains off. In this case, the operating status of the PFC and DC-DC multiplexing circuit 23 is similar to that in the utility power mode of the multiplexing circuit 22 in Embodiment two above, which will not be repeated here.

When utility power fails, the system is switched to the battery mode. In this case, the alternating current switch RLY231 is opened (turned off), and the direct current switch RLY232 is closed (turned on).

Figure 10A:
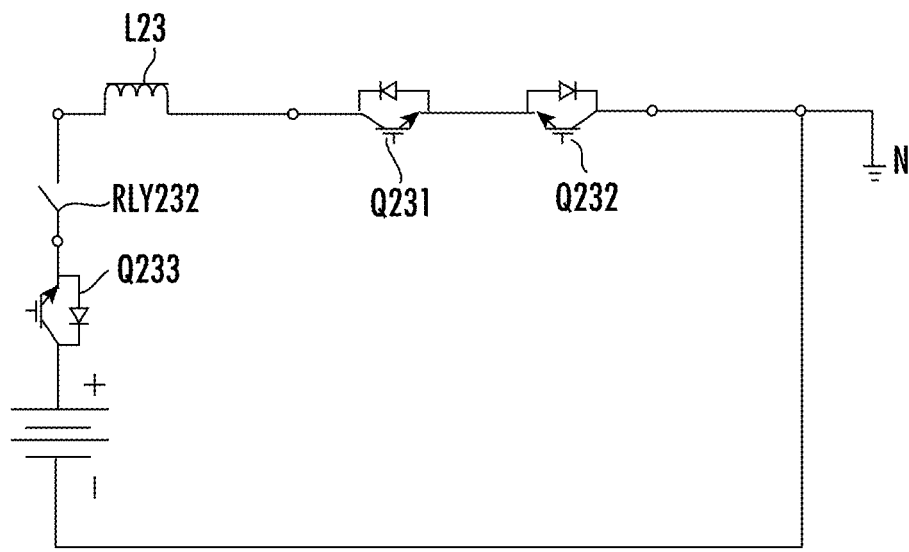
FIG. 10a and FIG. 10b are respectively schematic diagrams of equivalent circuits corresponding to a process in which a battery stores energy in an inductor (FIG. 10a) and a process in which the inductor charges a positive direct current bus (FIG. 10b) in a positive half cycle of a battery mode in the embodiment shown in FIG. 6.
Figure 10B:
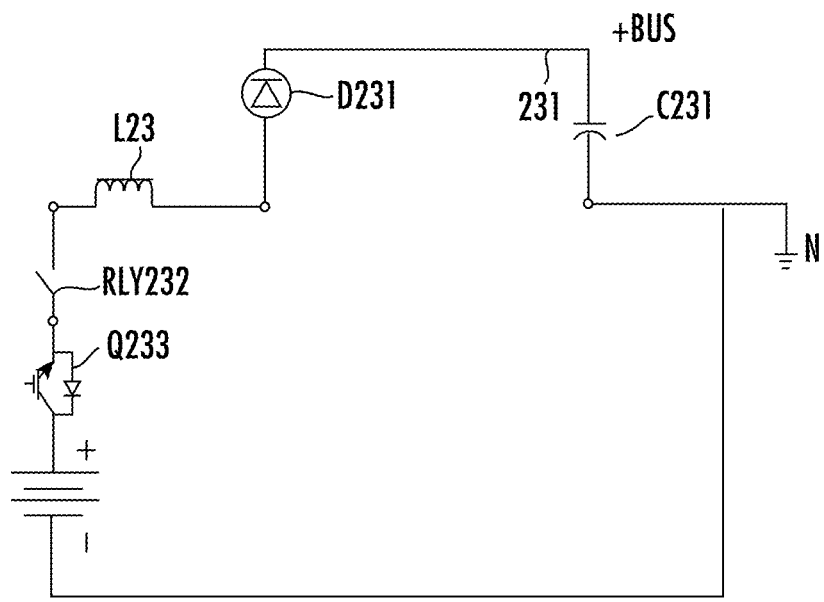

FIG. 10a and FIG. 10b are respectively schematic diagrams of equivalent circuits corresponding to a process in which a battery stores energy in an inductor (FIG. 10a) and a process in which the inductor charges a positive direct current bus (FIG. 10b) in a positive half cycle of the foregoing battery mode in the embodiment shown in FIG. 6. according to Embodiment three. In a process in which the battery B23 charges the positive side direct current bus 231 (the positive half cycle), the switching transistor Q232 and the switching transistor Q233 remain on, and the switching transistor Q231 is controlled to perform pulse width modulation to boost voltage and supply power to the positive direct current bus 231.

When the switching transistor Q231 is turned on, a current direction is as follows: the positive electrode of the battery B23→the inductor L23→the switching transistor Q231→the switching transistor Q232→the negative electrode of the battery B23, where the battery B23 stores energy in the inductor L23. When the switching transistor Q231 is turned off, the current direction is as follows: the positive electrode of the battery B23→the inductor L23→the diode D231→the capacitor C231→the negative electrode of the battery B23. The battery B23 and the inductor L23 are connected in series to boost voltage and charge the positive direct current bus 231.

As can be seen, in a process of charging the positive side positive direct current bus 231, the conducting wire 234 of the battery hookup bridge arm unit BU231 directly connects the negative electrode of the battery B23 to the neutral point N. Therefore, a potential of the negative electrode of the battery B23 remains a potential of the neutral point N.

Figure 11A:
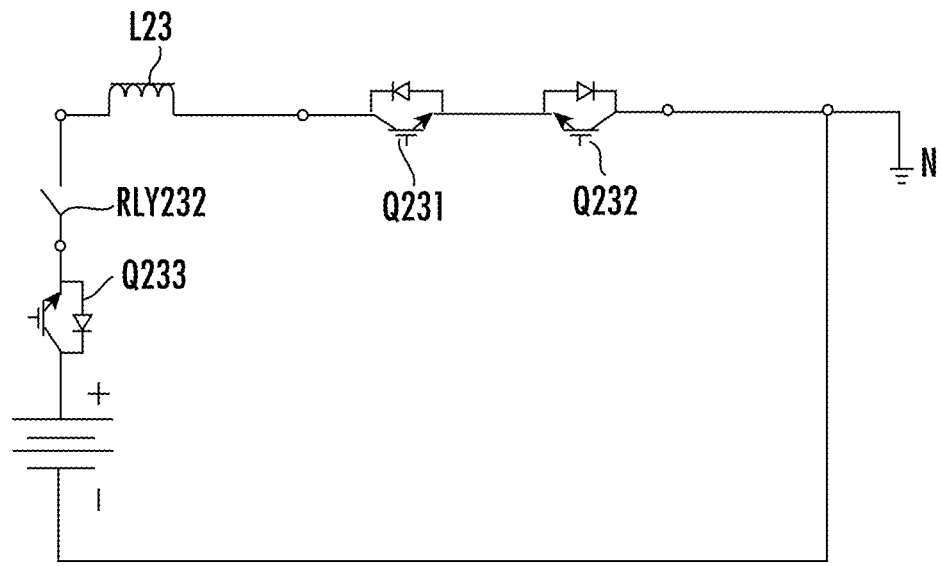
FIG. 11a and FIG. 11b are respectively schematic diagrams of equivalent circuits corresponding to a process in which a battery stores energy in an inductor (FIG. 11a) and a process in which the inductor charges a negative direct current bus (FIG. 11b) in a negative half cycle of the foregoing battery mode in the embodiment shown in FIG. 6.
Figure 11B:
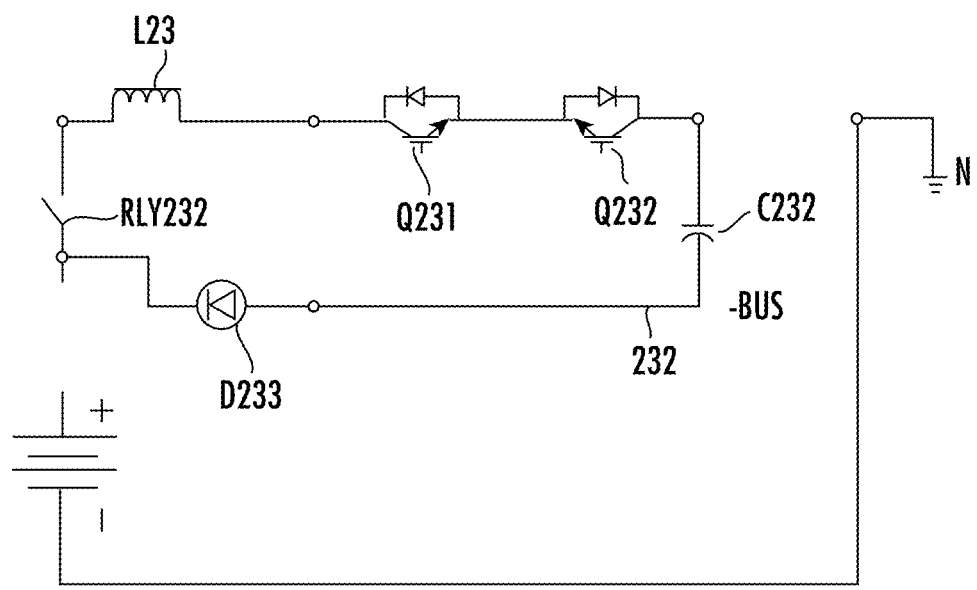

FIG. 11a and FIG. 11b are respectively schematic diagrams of equivalent circuits corresponding to a process in which a battery stores energy in an inductor (FIG. 11a) and a process in which the inductor charges a negative direct current bus (FIG. 11b) in a negative half cycle of the foregoing battery mode in the embodiment shown in FIG. 6. In a process in which the battery B23 charges the negative side direct current bus 232 (the negative half cycle), the switching transistor Q231 and the switching transistor Q232 remain on, and the switching transistor Q233 performs pulse width modulation, to charge the negative direct current bus 232.

When the switching transistor Q233 is turned on, the current direction is as follows: the positive electrode of the battery B23→the switching transistor Q233→the inductor L23→the switching transistor Q231→the switching transistor Q232→the negative electrode of the battery B23, where the battery B23 charges the inductor L23. When the switching transistor Q233 is turned off, the current direction is as follows: the inductor L23→the switching transistor Q231→the switching transistor Q232→the capacitor C232→the diode 233→the inductor L23. In a process of charging the negative side negative direct current bus 232, the negative electrode of the battery B23 is similarly directly connected to the neutral point N by the conducting wire 234, and a level of the negative electrode of the battery is equal to a level of the neutral point N.

In summary, in an entire process of alternate voltage BUCK-BOOST of the sides of positive and negative direct current buses, the level of the negative electrode of the battery remains equal to the level of the neutral point N. Because voltage between the positive and negative direct current buses is constant, a level of the positive electrode of the battery also remains constant.

Figure 1:
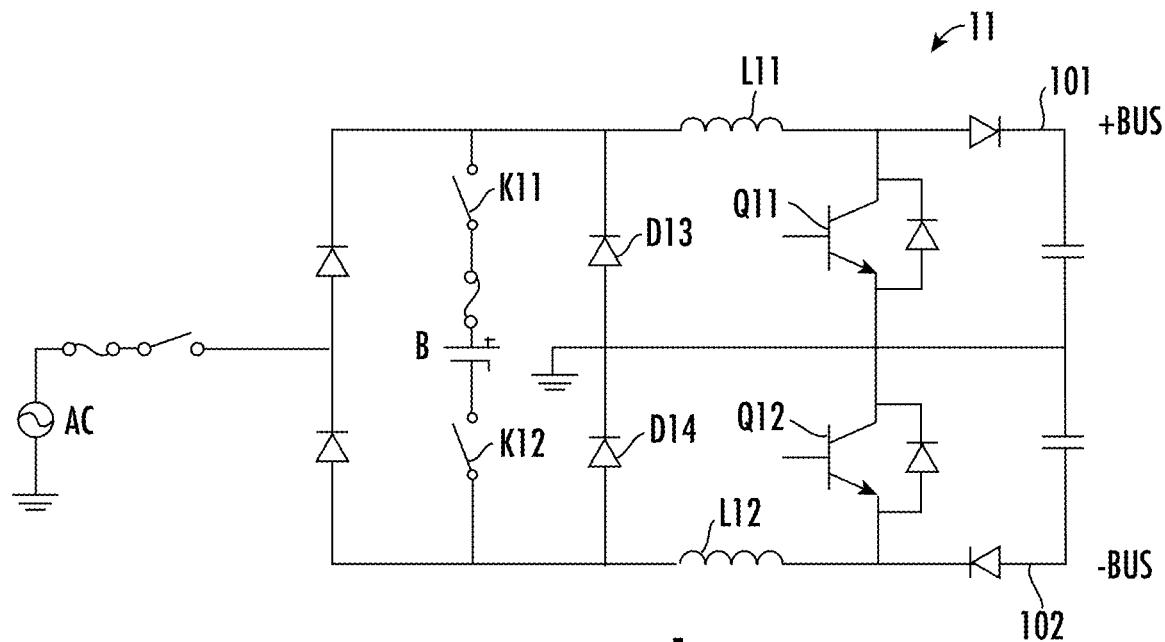
FIG. 1 is a schematic diagram of a multiplexing circuit of an AC-DC power factor correction (PFC) circuit and a battery discharge DC-DC circuit for a single-battery uninterruptible power supply commonly used in the existing technology.
Figure 2:
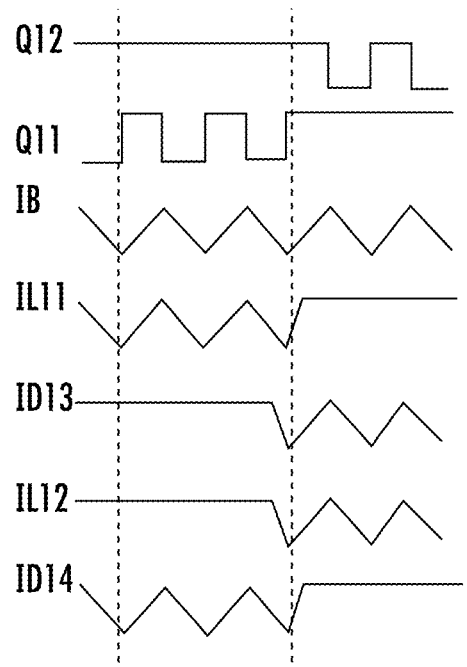
FIG. 2 shows a pulse-width modulation control signal and a current waveform of a corresponding device during the charging of the positive and negative sides of the circuit shown in FIG. 1.

In addition, a controllable rectifier bridge unit with a plurality of controllable switching transistors is used in all the multiplexing circuits in Embodiment one, two, and three. Compared with the dual BOOST circuit shown in FIG. 1, a rectifier bridge has better controllability, and only one inductor is used, so that utilization of the inductor is higher, and current conversion efficiency is higher in a utility power mode. In a battery mode, because a battery discharging and AC-DC PFC circuit for a single battery is arranged as a multiplexing circuit, the costs and size are significantly reduced. More importantly, in the battery mode, there is no high frequency jump in levels of output lines of positive and negative terminals of the battery, thereby resolving an electromagnetic compatibility problem caused by high frequency jumps in levels between two terminals of a single battery after a dual BOOST circuit is used in the battery and an overheating problem that occurs because an inductor remains on when there is no option but to add a clamping diode in the prior art.

Figure 12:
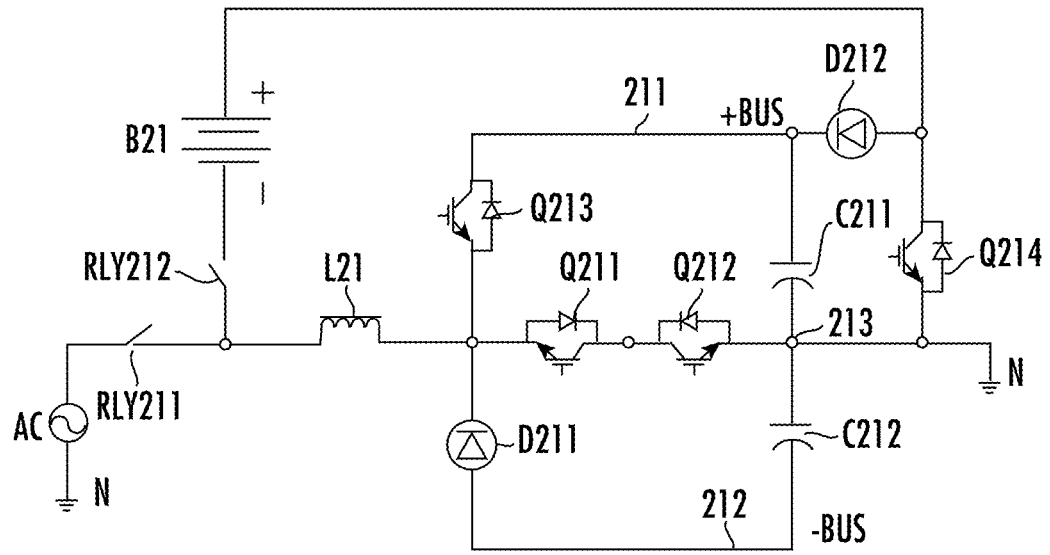
FIG. 12 to FIG. 14 respectively show variants of the embodiments in FIG. 3, FIG. 6, and FIG. 9.
Figure 13:
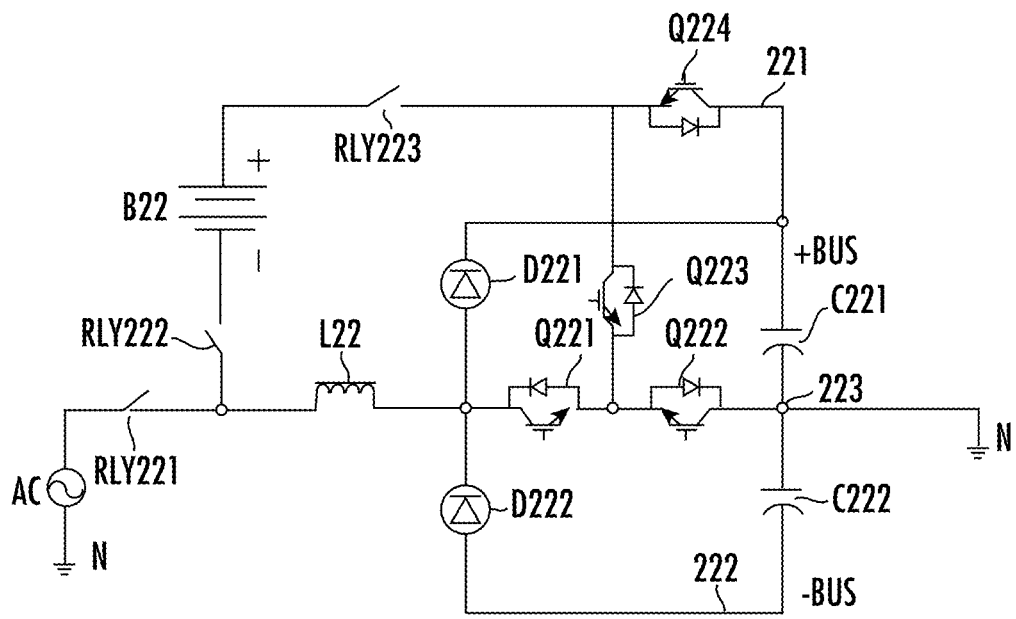
Figure 14:
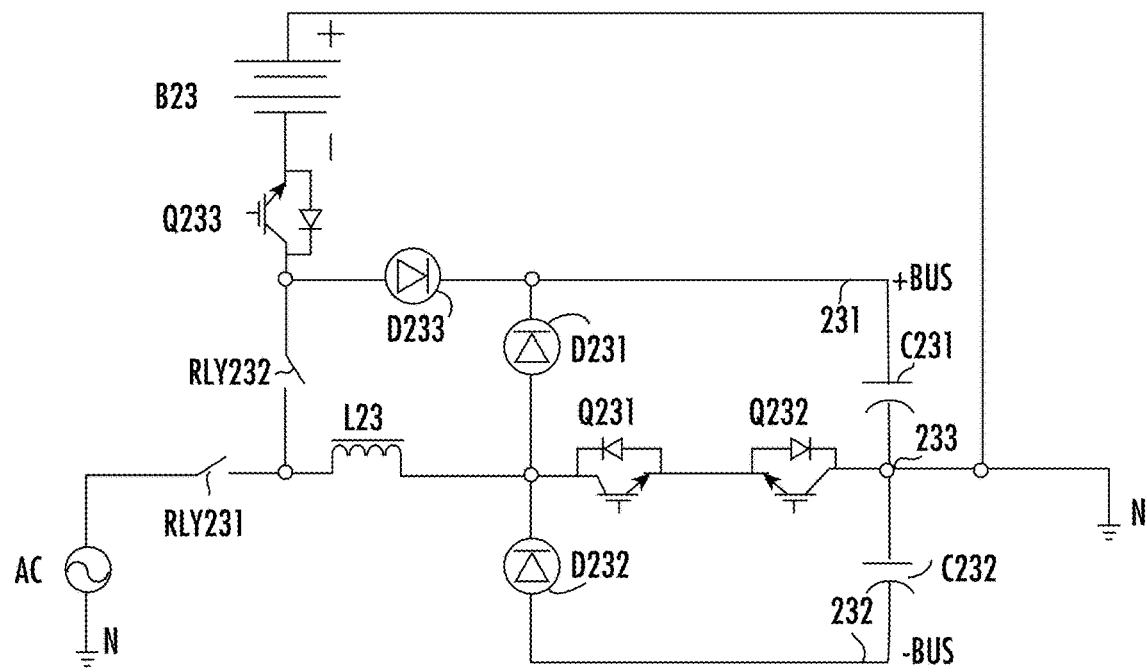

FIG. 12 to FIG. 14 respectively show variants of the embodiments in FIG. 3, FIG. 6, and FIG. 9. For example, in the embodiment shown in FIG. 12, the battery hookup bridge arm unit BU211 in the multiplexing circuit 21 in Embodiment one is arranged in the positive direct current bus 211 in a mirrored manner, the operating principle of this embodiment is similar to that of Embodiment one, and the same technical effects are produced. Similarly, in the embodiments shown in FIG. 13 and FIG. 14, the battery hookup bridge arm units in the multiplexing circuits in Embodiments 2 and 3 are respectively arranged in the positive direct current bus in a mirrored manner, and the same technical effects are produced. Because the circuit structures are similar, reference numerals consistent with those in FIG. 3, FIG. 6, and FIG. 9 are used in FIG. 12 to FIG. 14.

Embodiment Four

Figure 15:
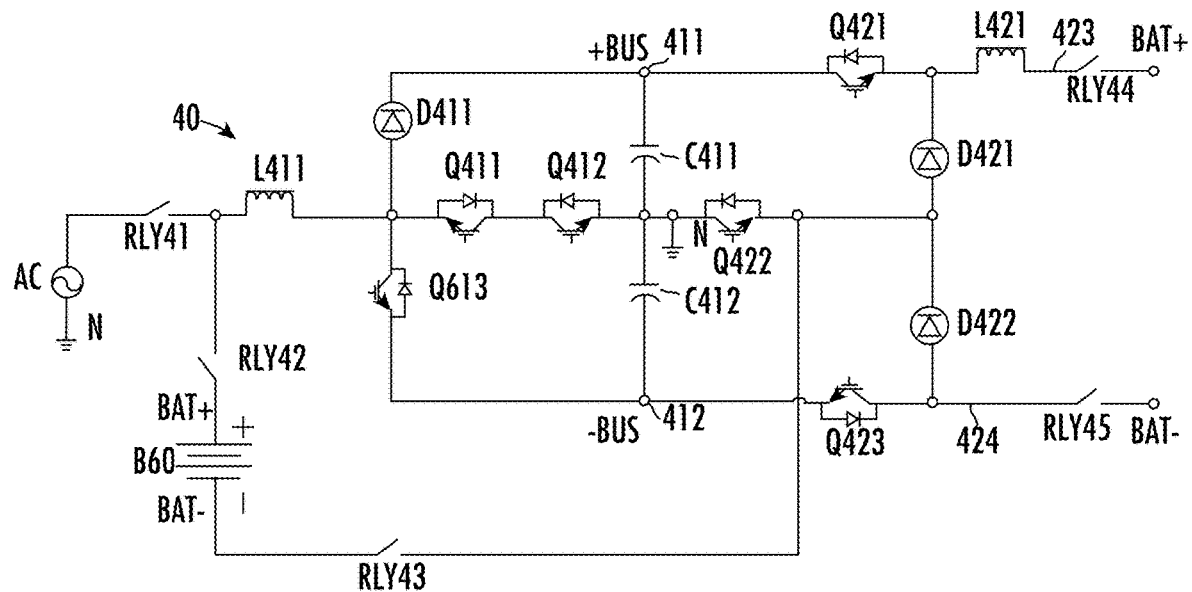
FIG. 15 is a schematic circuit diagram of a current conversion circuit of a single-battery uninterruptible power supply according to another preferred embodiment of the present invention.

FIG. 15 is a schematic circuit diagram of a multiplexing current conversion circuit (current converter) of a single-battery uninterruptible power supply according to another preferred embodiment of the present invention.

FIG. 15 shows a multiplexing current conversion circuit 40 in Embodiment four, including a PFC and DC-DC multiplexing circuit 41 and a charging circuit. A multiplexing part also exists in partial circuits of the PFC and DC-DC multiplexing circuit 41 and the charging circuit.

The PFC and DC-DC multiplexing circuit 41 shown in FIG. 15 has a structure and an operating mode similar to those of the PFC and DC-DC multiplexing circuit 21 described in Embodiment one. The PFC and DC-DC multiplexing circuit 41 includes an inductor L411, a switching transistor Q411 and a switching transistor Q412 (connected in reverse series with the switching transistor Q411) which are connected in series in sequence, as well as a diode D411, a switching transistor Q413, and direct current bus capacitors C411 and C412.

One terminal of the inductor L411 is connected to an emitter of the switching transistor Q411, and the other terminal of the inductor L411 is connected to single-phase alternating current AC by an alternating current switch RLY41 and is connected to a positive electrode of battery B40 by a direct current switch RLY42. A node formed by a connection between the direct current bus capacitors C411 and C412 is connected to a neutral point N.

A collector of the switching transistor Q411 is connected to a collector of the switching transistor Q412, an emitter of the switching transistor Q412 is connected to a node formed by a connection between one terminal of the direct current bus capacitor C411 and one terminal of the direct current bus capacitor C412 and is connected to the neutral point N, the other terminal of the direct current bus capacitor C411 is connected to a positive direct current bus 411 used as an output, and the other terminal of the direct current bus capacitor C412 is connected to negative direct current bus 412 used as another output.

A cathode of the diode D411 is connected to the positive direct current bus 411. An anode of the diode D411 is connected to a collector of the switching transistor Q413 to form a node, and the inductor L411 is connected to the emitter of the switching transistor Q411 by the node. An emitter of the switching transistor Q413 is connected to the negative direct current bus 412.

The PFC and DC-DC multiplexing circuit further includes a switching transistor Q422. A collector of the switching transistor Q422 is connected to the neutral point N, and an emitter of the switching transistor Q422 is connected to a negative electrode of the battery B40.

The charging circuit includes a switching transistor Q421, the switching transistor Q422 (as discussed above, the switching transistor Q422 is also used as an element of the PFC and DC-DC multiplexing circuit), a switching transistor Q423, a diode D421, a diode D422, and an inductor L421.

The switching transistor Q421 and the inductor L421 are connected in series for use as a positive side arm. An emitter of the switching transistor Q421 is connected to one terminal of the inductor L421, a collector of the switching transistor Q421 is connected to the positive direct current bus 411, and the other terminal of the inductor L421 is connected to a positive output terminal 423 and is connected to a direct current switch RLY44. The positive output terminal 423 is connected to a positive electrode of the battery B40 by the direct current switch RLY44 to charge the battery B40. The switching transistor Q423 is connected in series between the negative direct current bus 412 and a negative output terminal 424 for use as a negative side arm. An emitter of the switching transistor Q423 is connected to the negative direct current bus 412, and a collector of the switching transistor Q423 is connected to the negative output terminal 424 and is connected to a direct current switch RLY45. The negative output terminal 424 is connected to the negative electrode of the battery B40 by the direct current switch RLY45 to charge the battery B40. The switching transistor Q422 is used in the PFC and DC-DC multiplexing circuit, and is also used as a part of a middle bridge arm in the charging circuit 42. The collector of the switching transistor Q422 is connected to the neutral point N as discussed above, and the emitter of the switching transistor Q422 is further connected to a node formed between the two diodes D421 and D422 that are connected in forward series. An anode of the diode D421 is connected to a cathode of the diode D422, a cathode of the diode D421 is connected to a node formed by a connection between the emitter of the switching transistor Q421 and a terminal of the inductor L311, and an anode of the diode D422 is connected to a node between a collector of the switching transistor Q423 and the direct current switch RLY45. Although not shown, at least one capacitor may further be connected in series between the positive output terminal 423 and the negative output terminal 424.

The switching transistors in this embodiment are all exemplarily shown as insulated gate bipolar transistors connected with a diode in reverse parallel, but may be alternatively other appropriate transistors connected with a diode in reverse parallel.

An operating mode of the multiplexing current conversion circuit 40 is described below in detail.

Utility Power Mode

For Embodiment four, when single-phase alternating current power supply AC inputted from utility power is normal, the utility power supplies power to a load. In this case, the alternating current switch RLY41, the direct current switch RLY44, and the direct current switch RLY45 are turned off, and the direct current switches RLY42, RLY43 are turned on.

In the utility power mode, the PFC and DC-DC multiplexing circuit 41 rectifies alternating current into direct current and supplies the direct current to the positive and negative direct current buses, and can charge the single battery B40 through the charging circuit 42 using direct current power of the positive and negative direct current buses. The positive output terminal 423 of the charging circuit 42 is connected to the positive electrode of the battery B40 by the direct current switch RLY44, and the negative output terminal 424 of the charging circuit 42 is connected to the negative electrode of the battery B40 by the direct current switch RLY45.

Figure 16A:
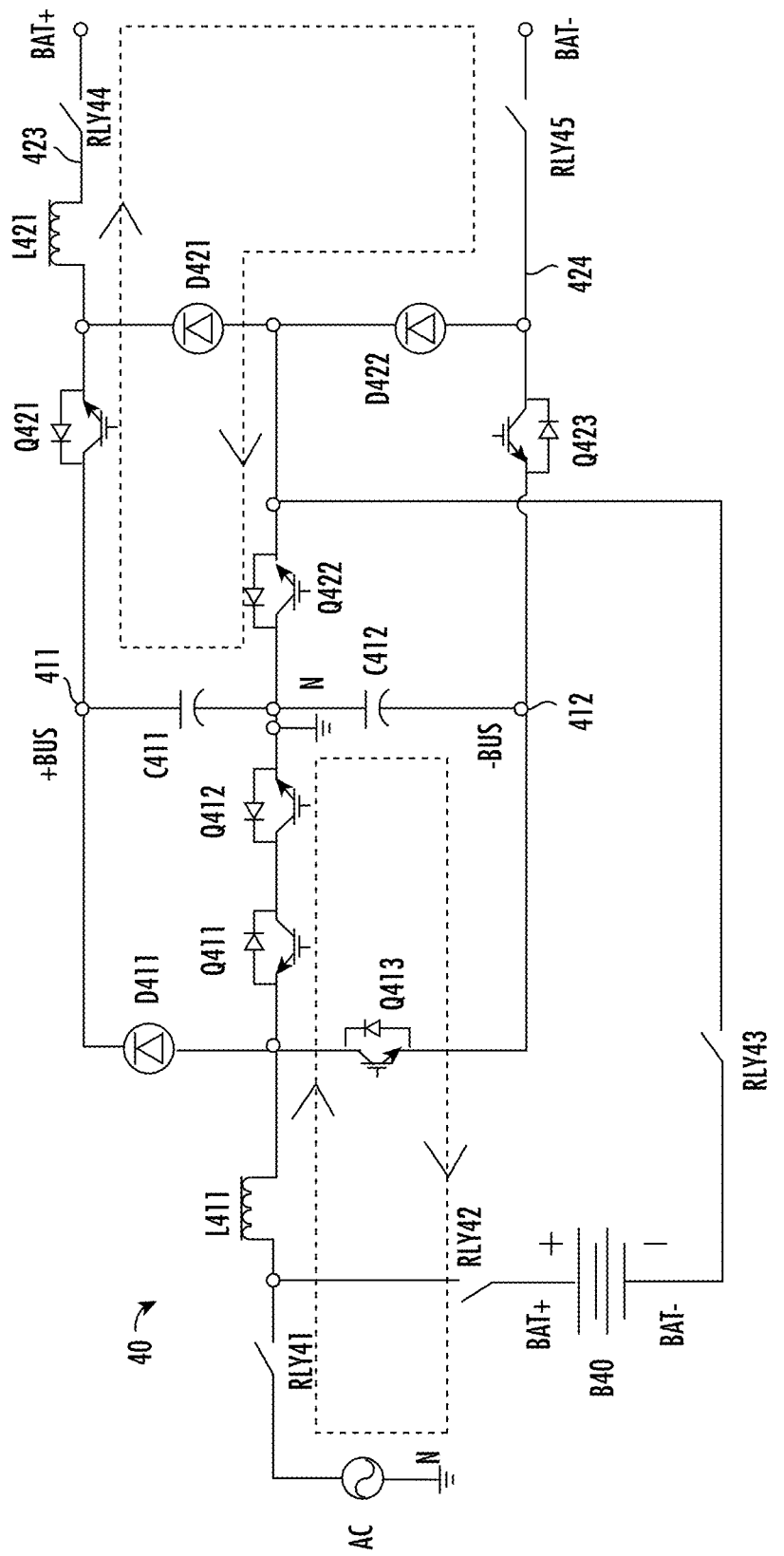
FIG. 16a and FIG. 16b are schematic diagrams of current directions in a positive half cycle of the current conversion circuit in FIG. 15 in a utility power mode.
Figure 16B:
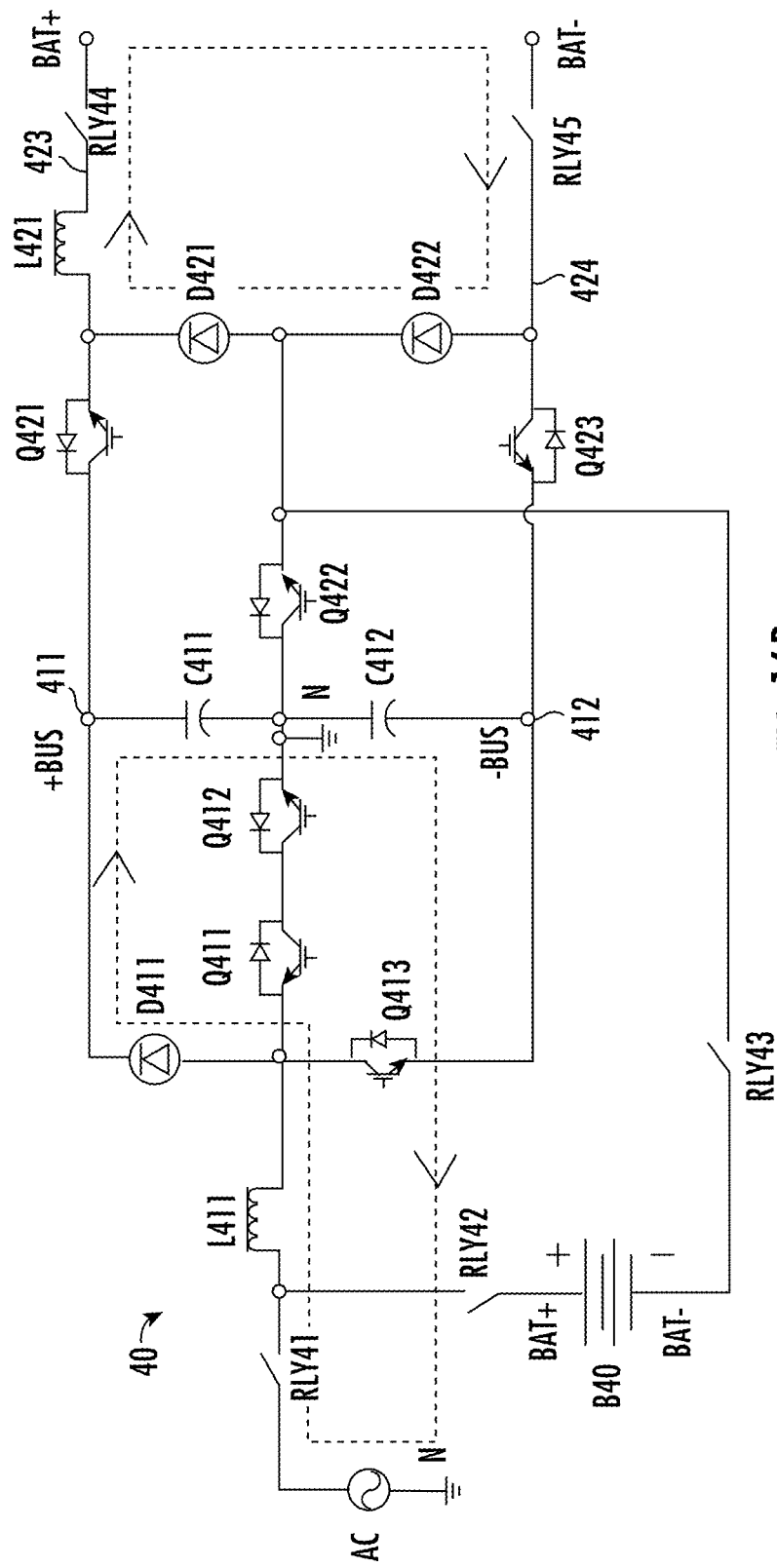

FIG. 16a and FIG. 16b are schematic diagrams of current directions in a positive half cycle of the current conversion circuit 40 in a utility power mode. In FIG. 16a, two dotted boxes with arrows are used to indicate flowing directions of current. Similarly, dotted boxes with arrows in FIG. 16b to FIG. 19b below are all used to represent current directions in circuits.

In the positive half cycle of utility power, the switching transistor Q413 of the circuit 41 remains off, the switching transistor Q411 remains on, and the switching transistor Q412 performs pulse width modulation. The switching transistor Q423 of the circuit 42 remains off, the switching transistor Q422 remains on, and the switching transistor Q421 performs pulse width modulation.

As shown in FIG. 16a, when the switching transistor Q412 is turned on, a current direction in the circuit 41 is as follows: the AC power supply→the inductor L411→the switching transistor Q411→the switching transistor Q412→the neutral point N, where the inductor L411 stores energy.

When the switching transistor Q421 is turned on, the positive direct current bus 411 in the circuit 42 supplies power to the charging circuit 42. The current direction is as follows: the positive direct current bus 411→the switching transistor Q421→the inductor L421→the positive output terminal 423→the positive electrode of the battery B40→the negative electrode of the battery B40→the diode D422→the switching transistor Q422→the neutral point N, where the inductor L421 stores energy.

As shown in FIG. 16b, when the switching transistor Q412 is turned off, the current direction in the circuit 41 is as follows: the AC power supply→the inductor L411→the diode D411→the capacitor C411→the neutral point N. The AC power supply and the inductor L411 are connected in series to boost voltage and supply power to the positive direct current bus 411.

When the switching transistor Q421 is turned off, the inductor L421 in the circuit 42 supplies freewheeling power to the charging circuit 42, and the current direction is as follows: the inductor L421→the positive output terminal 423→the positive electrode of the battery B40→the negative electrode of the battery B40→the diode D422→the diode D421→the inductor L421.

In the positive half cycle, a potential of the negative output terminal 423 (a potential of the negative electrode of the battery B40) remains a potential of the neutral point N, there is no high frequency jump, and an electromagnetic compatibility characteristic is excellent.

Figure 17A:
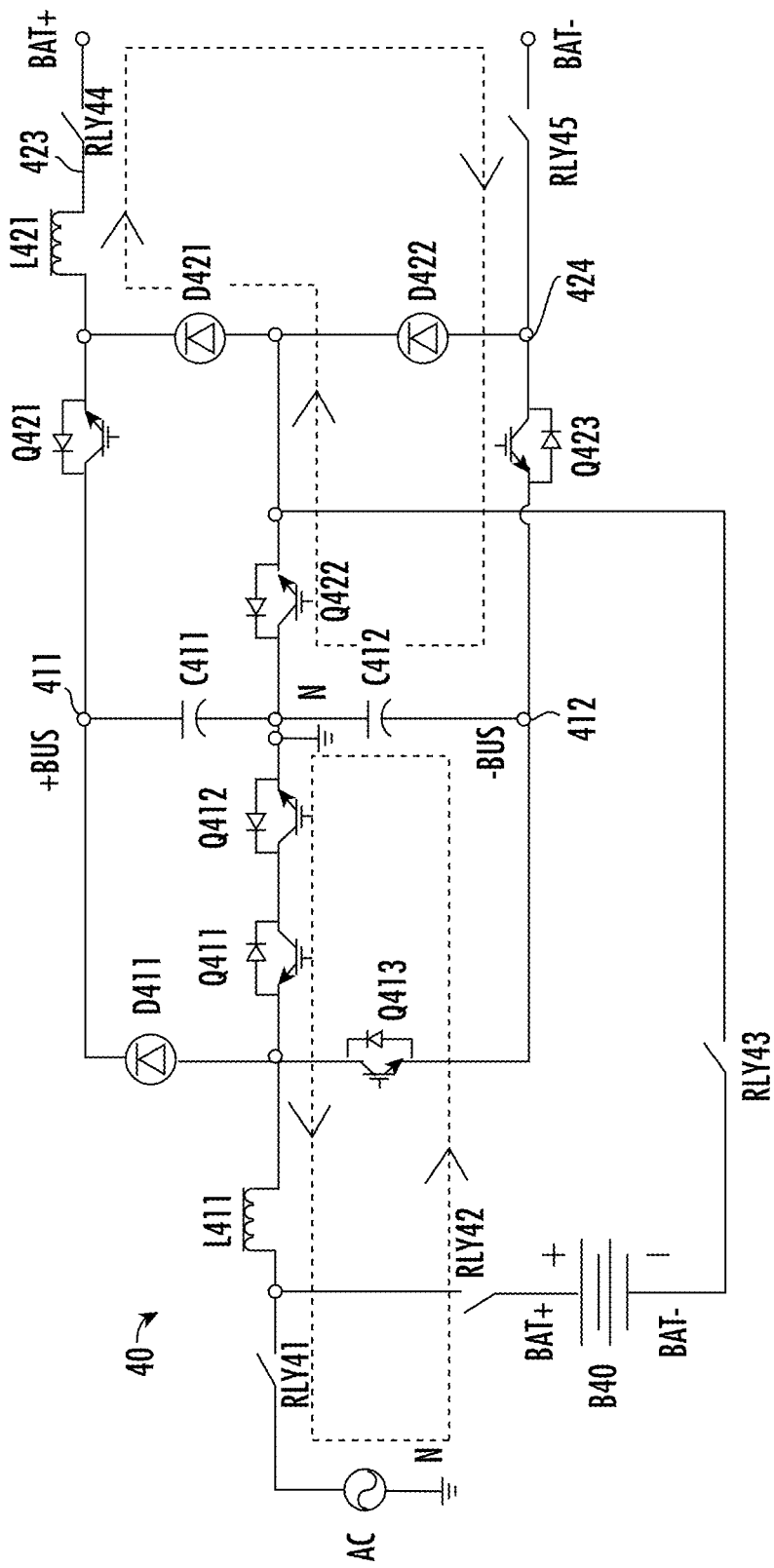
FIG. 17a and FIG. 17b are schematic diagrams of current directions in a negative half cycle of the current conversion circuit in FIG. 15 in the utility power mode.
Figure 17B:
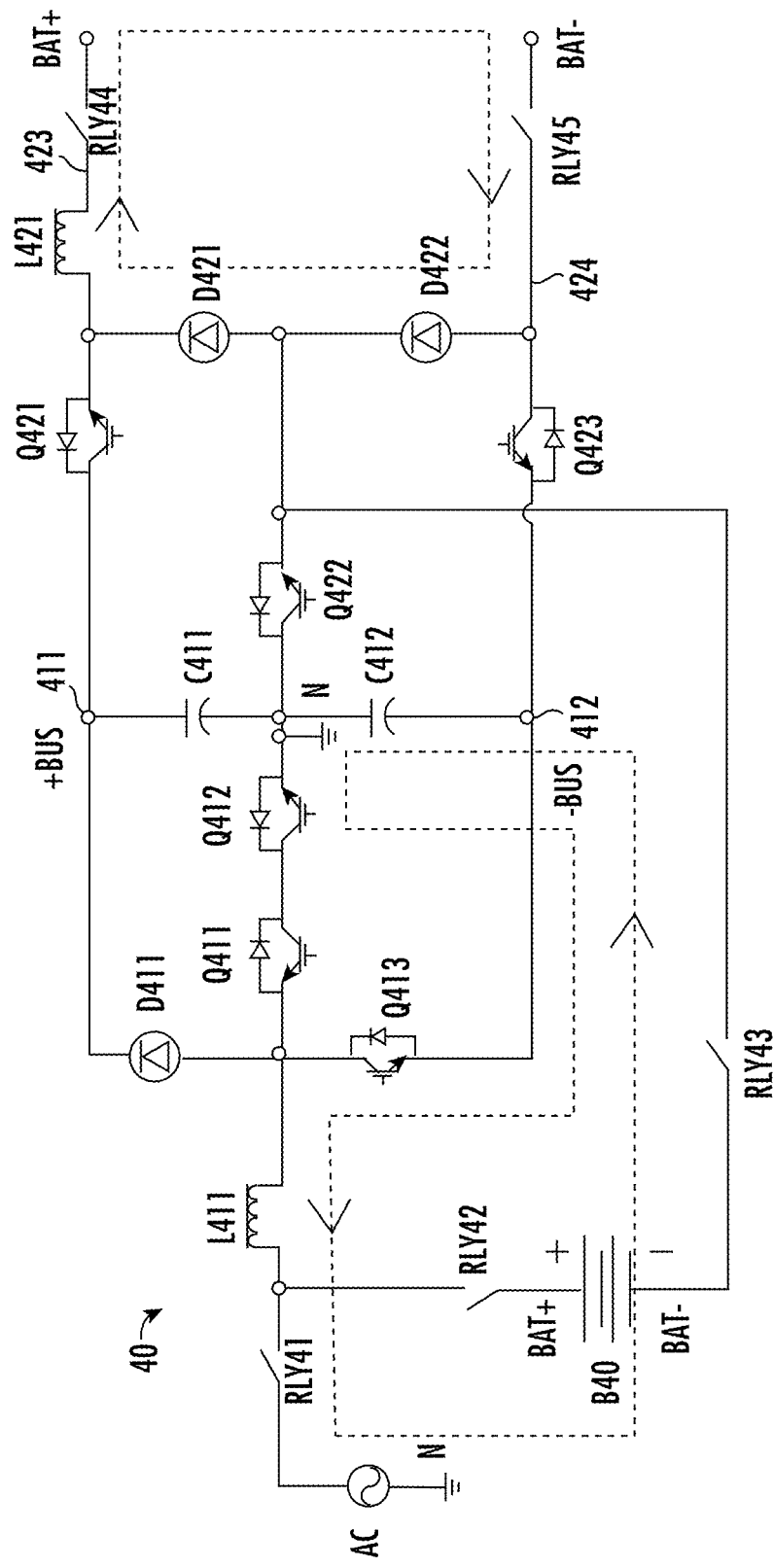

FIG. 17a and FIG. 17b are schematic diagrams of current directions in a negative half cycle of the multiplexing current conversion circuit in FIG. 15 in the utility power mode. For Embodiment four, in the negative half cycle of utility power, the switching transistor Q413 of the circuit 41 remains off, the switching transistor Q412 remains on, and the switching transistor Q411 performs pulse width modulation. The switching transistor Q421 of the circuit 42 remains off, the switching transistor Q423 remains on, and the switching transistor Q422 performs pulse width modulation.

As shown in FIG. 17a, when the switching transistor Q411 is turned on, the current direction in the circuit 41 is as follows: the neutral point N→the switching transistor Q412→the switching transistor Q411→the inductor L411→the AC power supply→the neutral point N, where the inductor L411 stores energy.

When the switching transistor Q422 is turned on, the negative direct current bus 412 in the circuit 42 supplies power to the charging circuit 42, and the current direction is as follows: the neutral point N→the switching transistor Q422→the diode D421→the inductor L421→the positive output terminal 423→the positive electrode of the battery B40→the negative electrode of the battery B40→the switching transistor Q423→the negative direct current bus 412, where the inductor L421 stores energy.

As shown in FIG. 17b, when the switching transistor Q411 is turned off, the current direction in the circuit 41 is as follows: the neutral point N→capacitor C412→the negative direct current bus 412→the switching transistor Q413→the inductor L411→the AC power supply→the neutral point N. The AC power supply and the inductor L411 are connected in series to boost voltage and supply power to the negative direct current bus 412.

When the switching transistor Q422 is turned off, the inductor L421 in the circuit 42 supplies freewheeling power to the charging circuit 42, and the current direction is as follows: the inductor L421→the positive output terminal 423→the positive electrode of the battery B40→the negative electrode of the battery B40→the diode D422→the diode D421→the inductor L421.

Similar to the technical effects of the positive half cycle, in the negative half cycle, the potential of the negative output terminal 423 (the potential of the negative electrode of the battery B40) remains the potential of the negative direct current bus 412, there is no high frequency jump, and the electromagnetic compatibility characteristic is excellent.

Battery Mode

For the current conversion circuit 40 in Embodiment four shown in FIG. 15, when a utility power input fails, a control module of the uninterruptible power supply controls the uninterruptible power supply to switch from utility power to supply of power to the load by a single battery. In this case, the alternating current switch RLY41, the direct current switch RLY44, and the direct current switch RLY45 are opened (turned off), and the direct current switches RLY42, RLY43 are closed (turned on).

In the battery mode, the PFC and DC-DC multiplexing circuit 41 boosts voltage of direct current supplied by the battery B40 and provides the direct current to the positive and negative direct current buses to output power externally (for example, to a DC-AC module).

In the positive half cycle, the switching transistor Q413 remains off, the switching transistor Q411 and the switching transistor Q422 remain on, and the switching transistor Q412 performs pulse width modulation; and the switching transistor Q421 and the switching transistor Q423 remain off.

Figure 18A:
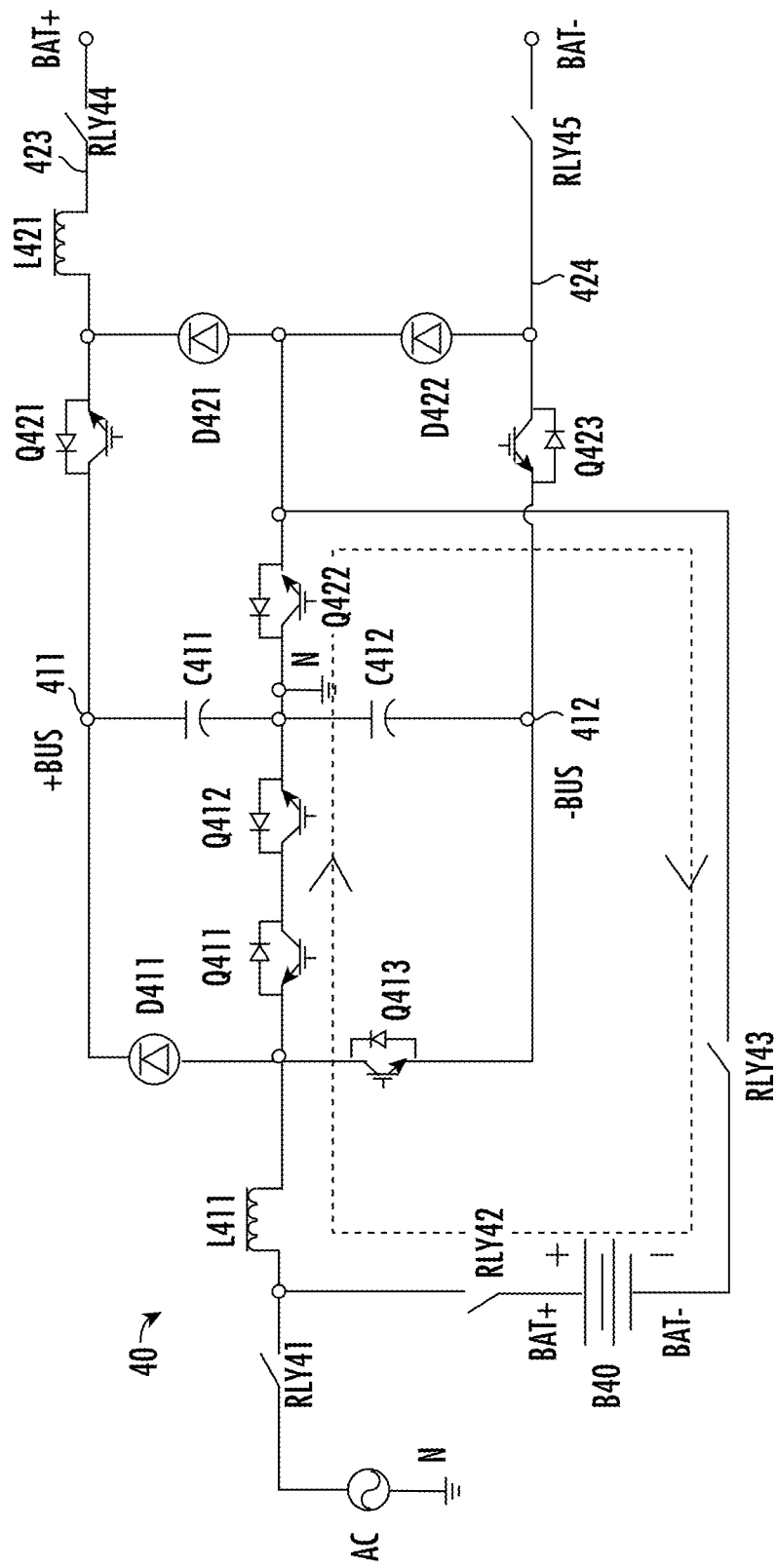
FIG. 18a and FIG. 18b are respectively schematic diagrams of equivalent circuits corresponding to a process in which energy is stored in an inductor (FIG. 18a) and a process in which the inductor and a battery supply power to a positive direct current bus (FIG. 18b) in a positive half cycle of a battery mode of a current conversion circuit 40 in FIG. 15.
Figure 18B:
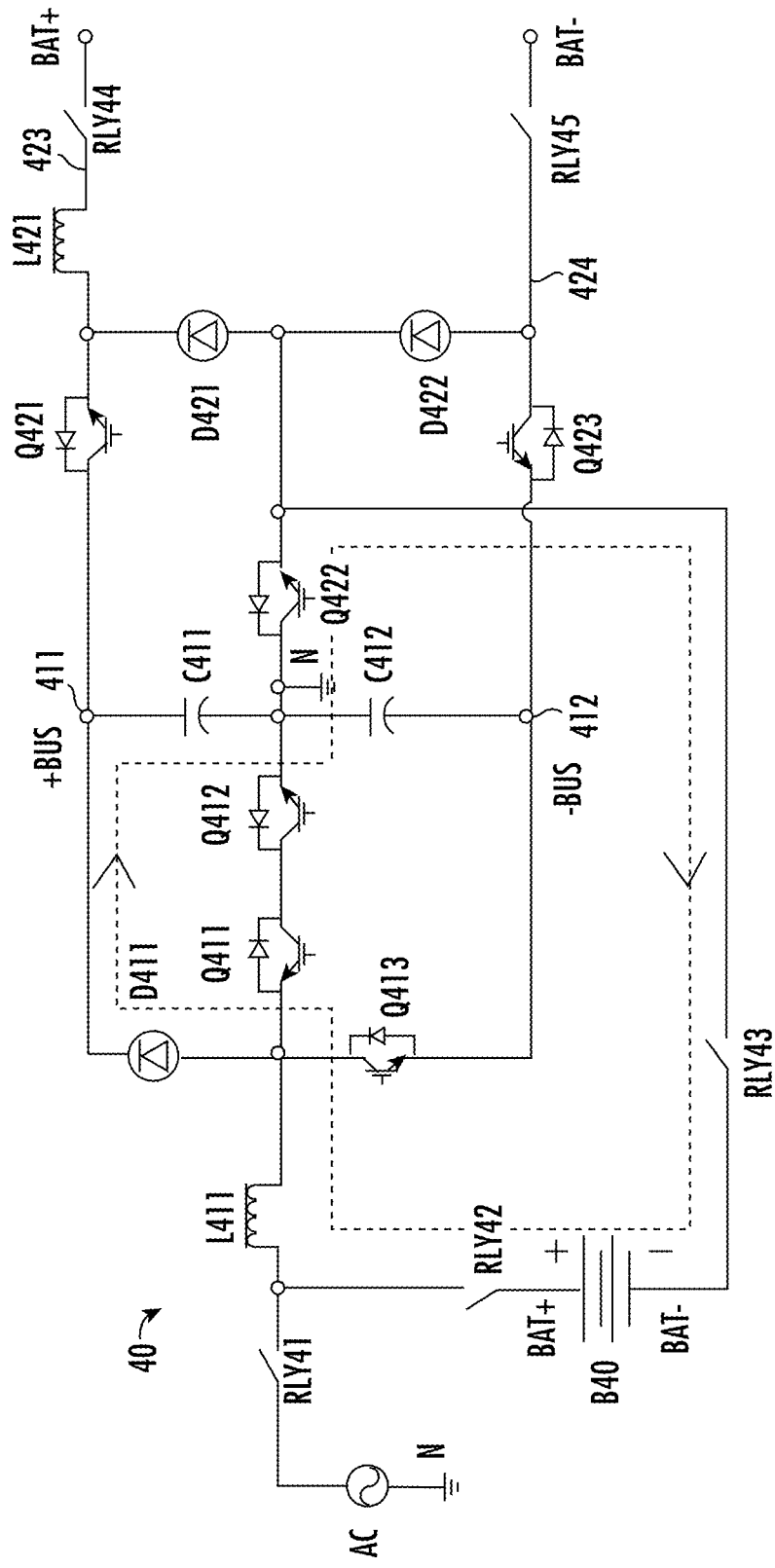

FIG. 18*a* and FIG. 18*b* are respectively schematic diagrams of equivalent circuits corresponding to a process in which energy is stored in an inductor (FIG. 18*a*) and a process in which the inductor and a battery supply power to a positive direct current bus (FIG. 18*b*) in a positive half cycle of a battery mode of a current conversion circuit 40 in FIG. 15.

FIG. 18*a* is a schematic diagram of a current direction of a process in which energy is stored in an inductor in a positive half cycle of the current conversion circuit 40 in a battery mode. When the switching transistor Q412 is turned on, the current direction is as follows: the positive electrode of the battery B40→the inductor L411→the switching transistor Q411→the switching transistor Q412→the switching transistor Q422→the negative electrode of the battery B40, where the inductor L411 is charged.

FIG. 18*b* is a schematic diagram of a current direction of a process in which an inductor and a battery boost voltage and supply power to a positive direct current bus in a positive half cycle of the current conversion circuit 40 in a battery mode. When the switching transistor Q412 is turned off, the current direction is as follows: the positive electrode of the battery B40→the inductor L411→the diode D411→the positive direct current bus 411→the capacitor C411→the switching transistor Q422→the negative electrode of the battery B40. The inductor L411 and the battery B40 are connected in series to boost voltage and supply power to the positive direct current bus 411. In the positive half cycle, the potential of the negative electrode of the battery B40 remains the potential of the neutral point N, there is no high frequency jump, and the electromagnetic compatibility characteristic is excellent.

Figure 19A:
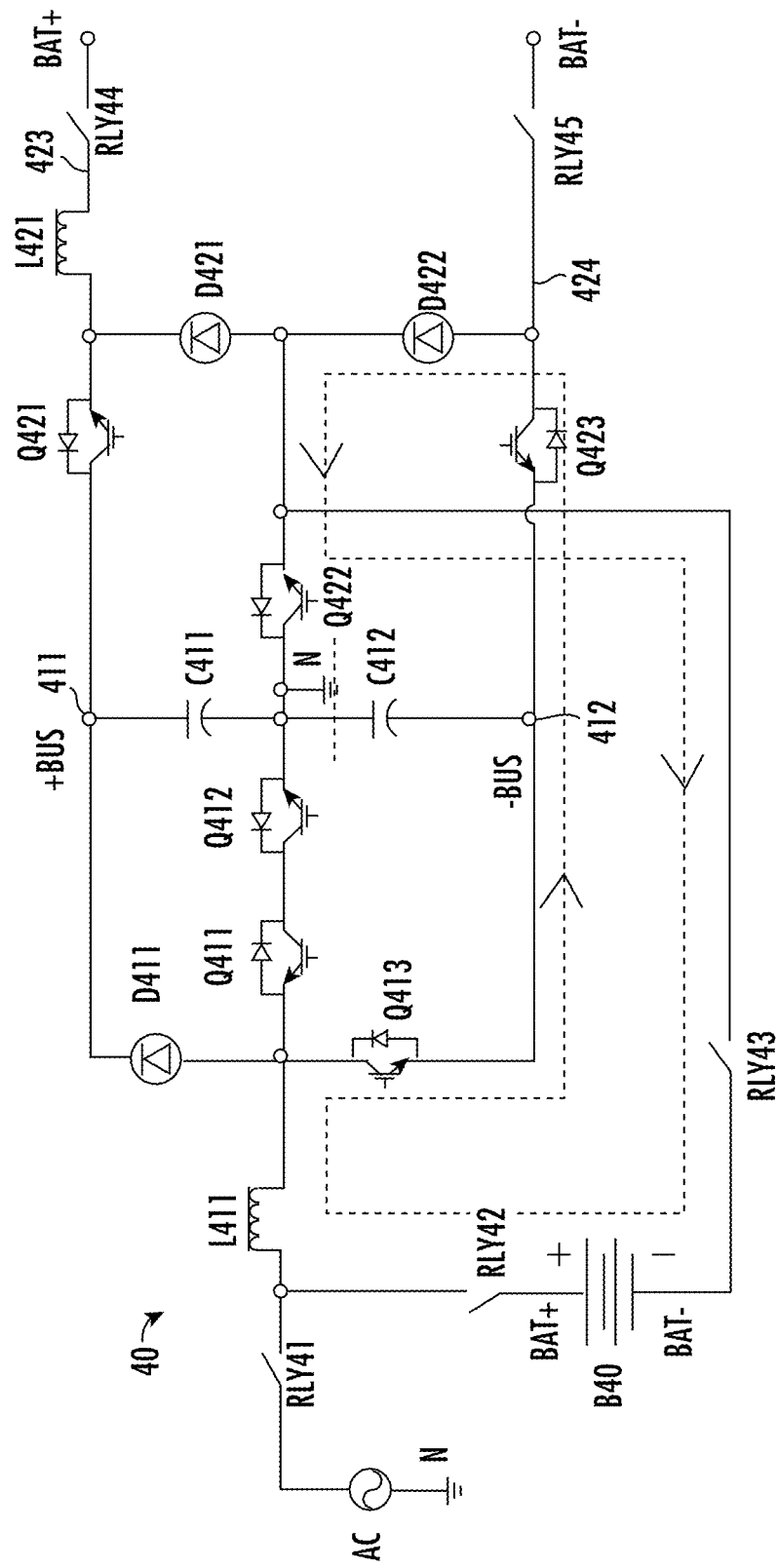
FIG. 19a and FIG. 19b are respectively schematic diagrams of equivalent circuits corresponding to a process in which energy is stored in an inductor (FIG. 19a) and a process in which the inductor and a battery supply power to a positive direct current bus (FIG. 19b) in a negative half cycle of a battery mode of a current conversion circuit 40 in FIG. 15.
Figure 19B:
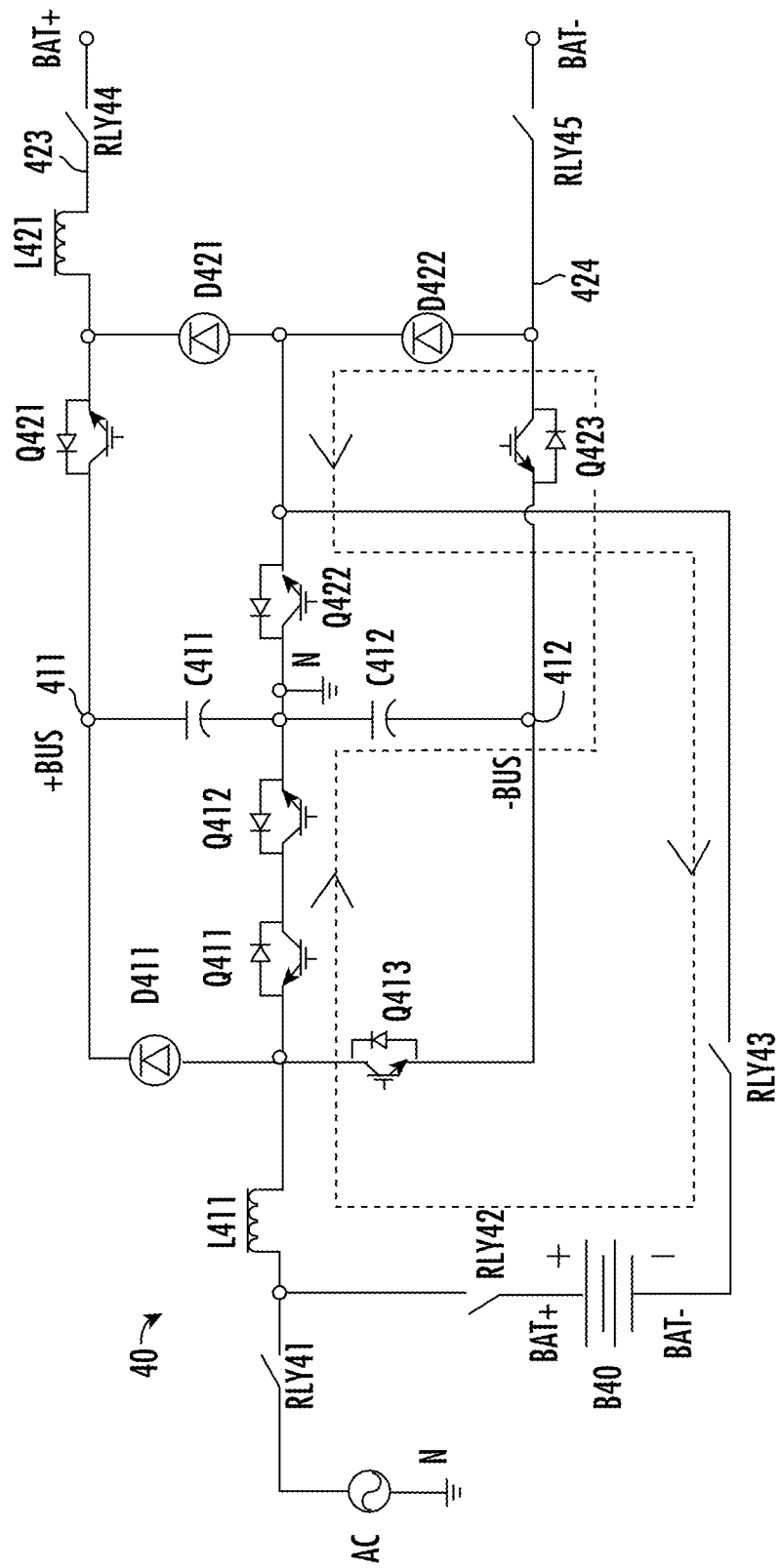

FIG. 19*a* and FIG. 19*b* are respectively schematic diagrams of equivalent circuits corresponding to a process in which energy is stored in an inductor (FIG. 19*a*) and a process in which the inductor and a battery supply power to a positive direct current bus (FIG. 19*b*) in a negative half cycle of a battery mode of a current conversion circuit 40 in FIG. 15.

In the negative half cycle, the switching transistor Q411 and the switching transistor Q422 remain off, the switching transistor Q412 remains on, and the switching transistor Q413 performs pulse width modulation; and the switching transistor Q421 remains off, and the switching transistor Q423 remains on.

FIG. 19*a* is a schematic diagram of a current direction of a process in which energy is stored in an inductor in a negative half cycle of the current conversion circuit 40 in a battery mode. When the switching transistor Q413 is turned on, the current direction is as follows: the positive electrode of the battery B40→the inductor L411→the switching transistor Q413→the negative direct current bus 412→the switching transistor Q423→the diode D422→the negative electrode of the battery B40, where the inductor L411 stores energy.

FIG. 19*b* is a schematic diagram of a current direction of a process in which an inductor and a battery boost voltage and supply power to a negative direct current bus in a negative half cycle of the current conversion circuit 40 in a battery mode. When the switching transistor Q413 is turned off, the current direction is as follows: the positive electrode of the battery B40→the inductor L411→the switching transistor Q411→the switching transistor Q412→the capacitor C412→the negative direct current bus 412→the switching transistor Q423→the diode D422→the negative electrode of the battery B40. The inductor L411 and the battery B40 are connected in series to boost voltage and supply power to the negative direct current bus 412. In the entire negative half cycle process, the potential of the negative electrode of the battery B40 remains the potential of the negative direct current bus 412, and there is no high frequency jump.

Therefore, in a charging process (the utility power mode) and a discharging process (the battery mode) of the single battery B40, neither of the potentials of the positive electrode and negative electrode of the battery B40 has high frequency jumps (a voltage between the positive electrode and negative electrode of the battery B40 is constant), thereby resolving a disadvantage of a significantly low electromagnetic compatibility characteristic after a single battery is hooked up in a dual BOOST circuit in the prior art, so that technical effects are excellent.

In addition, as can be seen from the foregoing description, the switching transistor Q422 is a power device in a battery hookup bridge arm unit of the PFC and DC-DC multiplexing circuit 41, and is also a power device in a middle arm of the charging circuit 42 (for example, similar to a switching transistor Q312 in FIG. 17). Similarly, the switching transistor Q423 and the diode D422 connected in series are used as a power device in the battery hookup bridge arm unit between the negative direct current bus and the negative electrode of the battery in the multiplexing circuit 41 in the battery mode, and are also used as a power device in the charging circuit 42. For example, the switching transistor Q423 is used as a power device of the negative side arm of the charging circuit 42. Therefore, the current conversion circuit 40 forms a highly multiplexing circuit of the PFC and DC-DC multiplexing circuit 41 and the charging circuit 42, which has less power switch elements, higher level of integration, and lower costs.

Figure 20:
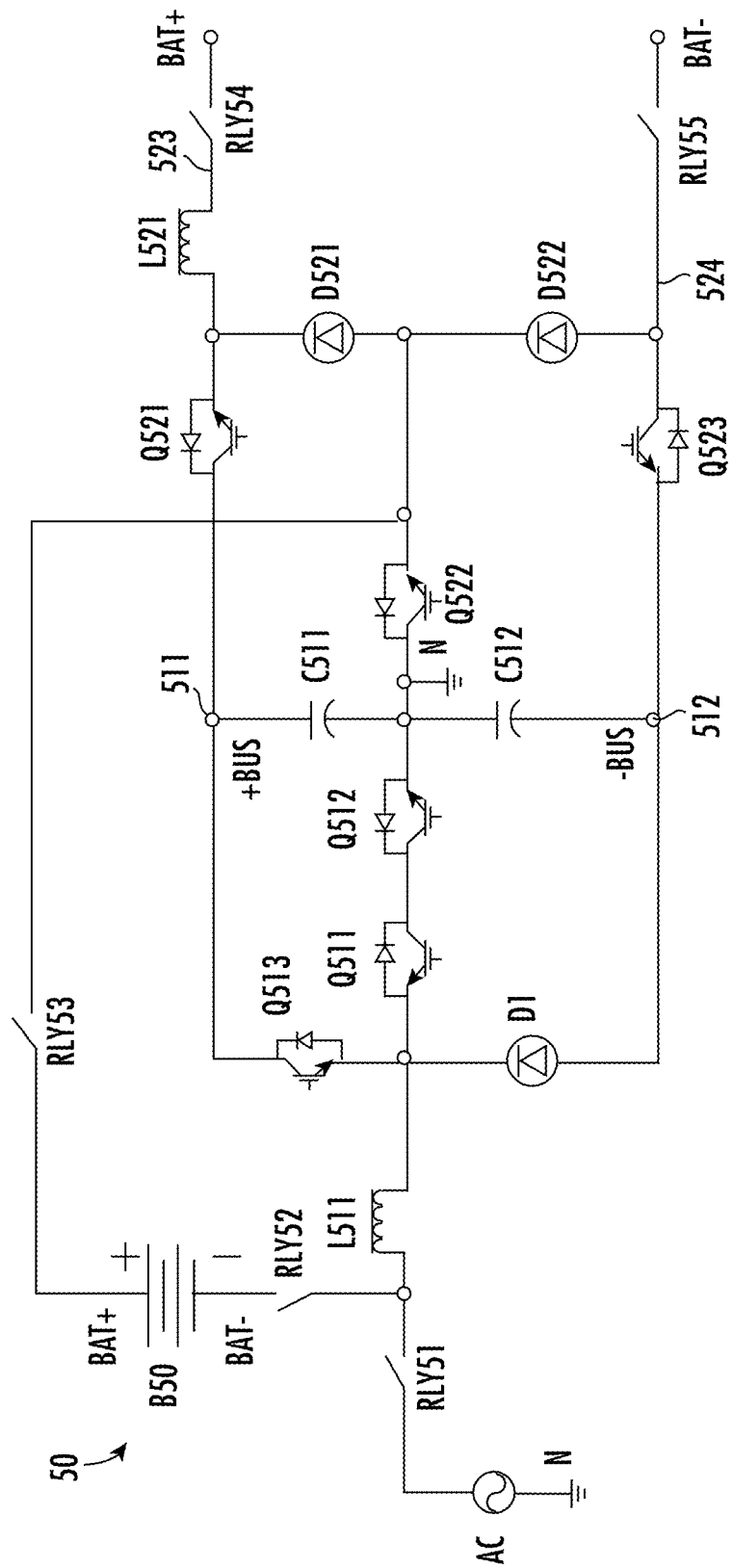
FIG. 20 to FIG. 22 show other variants of the current conversion circuit 40 in FIG. 15.
Figure 21:
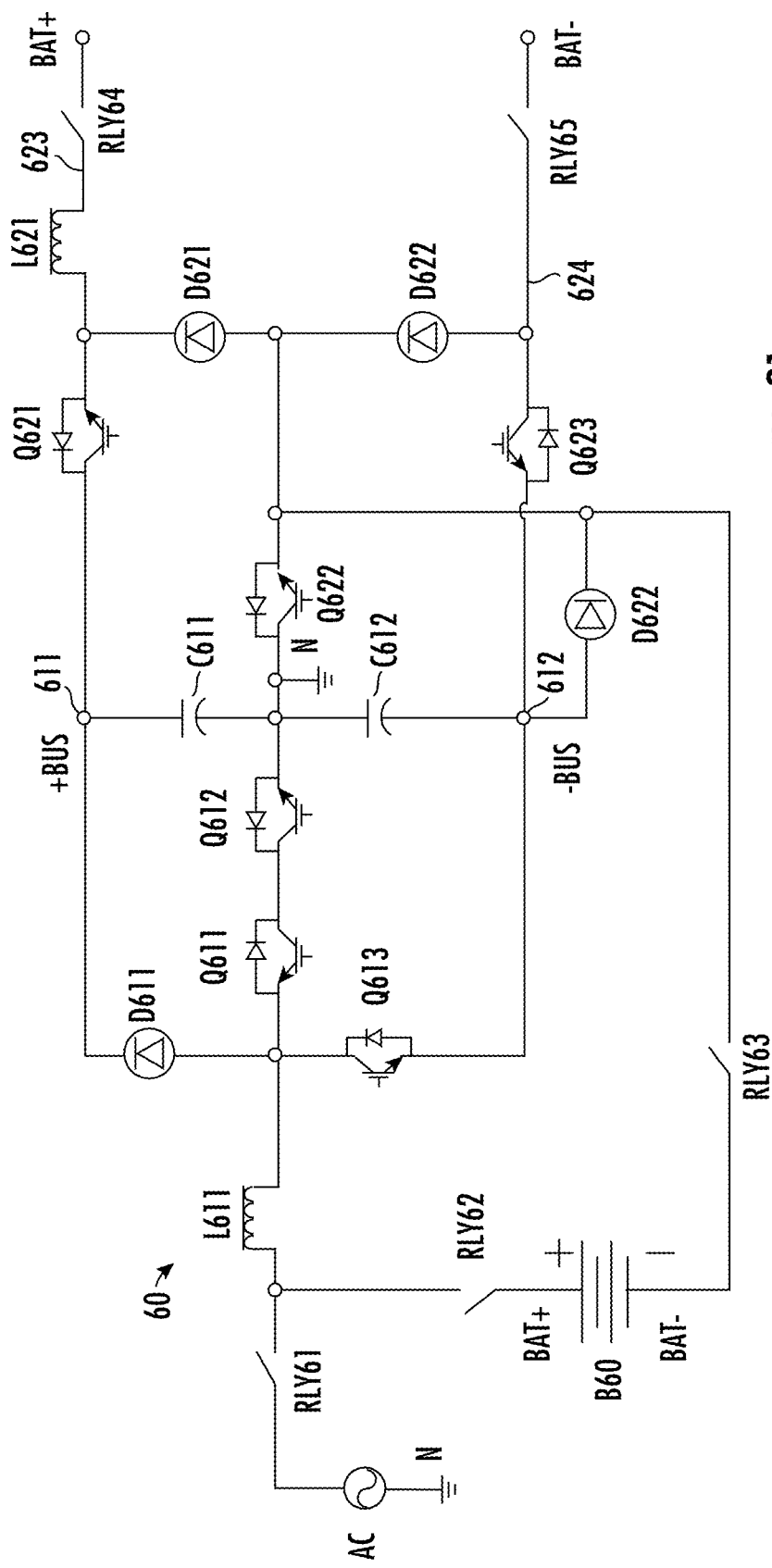
Figure 22:
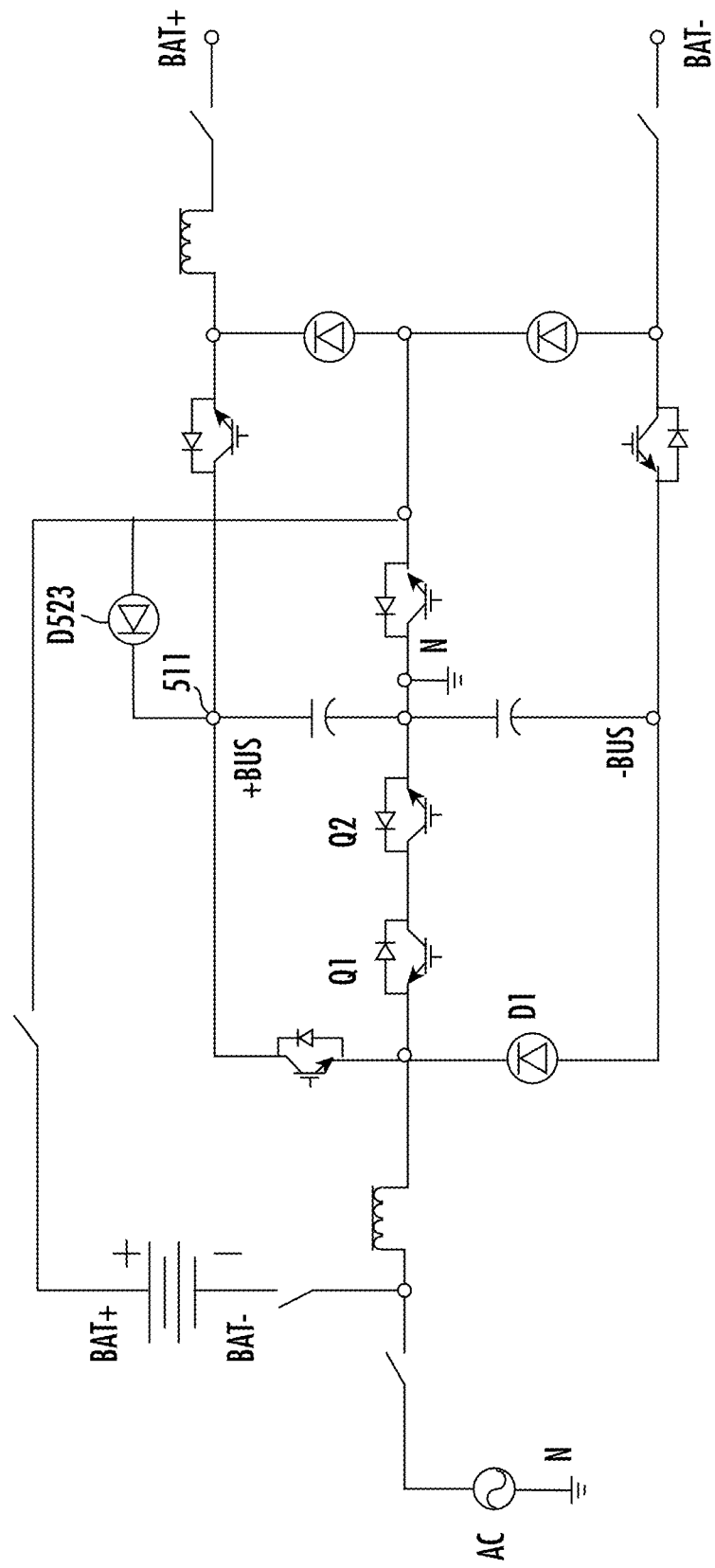

FIG. 20 to FIG. 22 show other variants of the current conversion circuit 40 in FIG. 15.

FIG. 20 shows a current conversion circuit 50 in which a battery hookup position is mirrored from a negative direct current bus to a side of a positive direct current bus. A positive electrode of a battery B50 is connected to an emitter of a switching transistor Q522, and a negative electrode of the battery B50 is connected between an inductor L511 and an alternating current switch RLY51. A switching transistor is arranged between the inductor L511 and a positive direct current bus 511, and a diode is arranged between the inductor L511 and the positive direct current bus 511. The control logic and technical effects of the current conversion circuit 50 are similar to those of the current conversion circuit 40.

FIG. 21 shows a current conversion circuit 60 that is another variant of the current conversion circuit 40. A diode D623 is added between a negative direct current bus 612 and the negative electrode of the battery, so that the circuit can be better applied to a scenario in which power that needs to be designed for a charging circuit is low.

FIG. 22 shows another variant of the current conversion circuit 40. In the variant, it may be considered that a diode D523 is added between the positive direct current bus 511 of the current conversion circuit 50 and the positive electrode of the battery, so that the circuit can be better applied to a scenario in which power that needs to be designed for a charging circuit is low.

Although not shown in FIG. 15 and FIG. 20 to FIG. 22, at least one capacitor may be further connected in series between the positive output terminal and the negative output terminal of the current conversion circuit. For example, one capacitor may be further connected in series between the positive output terminal 423 and the negative output terminal 424 in FIG. 15.

In other variant embodiments according to the current conversion circuit, the PFC and DC-DC multiplexing converter has the following structure: when the battery hookup bridge arm is connected to the positive electrode of the battery and is powered by the battery, the battery hookup bridge arm alternately connects the positive electrode of the battery to the neutral point and the positive direct current bus; or when the battery hookup bridge arm is connected to the positive electrode of the battery and is powered by the battery, the positive electrode of the battery is directly connected to the neutral point.

The present invention further provides a single-battery uninterruptible power supply, including the current conversion circuit in the foregoing embodiments of the present invention.

Although a single-phase alternating current output is used as an example in the embodiments of this application, those having ordinary skill in the art may apply the current conversion circuit in the embodiments to a three-phase alternating current input without departing from the scope of protection of the present invention.

Although the switching transistors in the embodiments of this application are shown as insulated gate bipolar transistors connected with a diode in reverse parallel between a collector and an emitter, the switching transistors may be replaced with metal-oxide-semiconductor field effect transistors (MOSFETs) or thyristors connected with a diode in reverse parallel or other appropriate transistors connected with a diode in reverse parallel or other controllable electronic switches as required.

Although the present invention has been described by way of preferred embodiments, the present invention is not limited to the embodiments described herein, but includes various changes as well as variations made without departing from the scope of the present invention.

What is claimed is:

1. A power factor correction (PFC) and DC-DC multiplexing converter, comprising:
    a multiplexing bridge arm comprising:
    a first inductor having a first terminal configured to be selectively connected to utility power or a battery;
    a first switching transistor and a second switching transistor connected in reverse series between a second terminal of the first inductor and a neutral point;
    positive and negative direct current buses;
    a first capacitor and a second capacitor respectively connected between the positive and negative direct current buses and the neutral point;
    a first diode having an anode connected to a terminal of the first inductor and a cathode connected to the positive direct current bus; and
    a third switching transistor having a first terminal connected to the second terminal of the first inductor and a second terminal connected to the negative direct current bus; and
    a battery hookup bridge arm connected between the battery and the multiplexing bridge arm and configured to alternately supply power to the positive and negative direct current buses; and
    wherein the PFC and DC-DC multiplexing converter selectively causes one electrode of a positive electrode and a negative electrode of the battery to be alternately connected to the neutral point and one of the positive and negative direct current buses that has the same polarity as the one electrode or one electrode of a positive electrode and a negative electrode of the battery to be constantly connected to the neutral point.

2. The PFC and DC-DC multiplexing converter of claim 1:
    wherein in response to the battery hookup bridge arm being connected to the negative electrode of the battery and being powered by the battery, the battery hookup bridge arm alternately connects the negative electrode of the battery to the neutral point and the negative direct current bus
    wherein in response to the battery hookup bridge arm being connected to the positive electrode of the battery and being powered by the battery, the negative electrode of the battery is directly connected to the neutral point;
    wherein, in a positive half cycle of power supply of the battery:
    the first inductor stores energy in response to the first inductor forming a direct loop with the battery through the battery hookup bridge arm; and
    the inductor and the battery charge the first capacitor in response to the first inductor forming a loop with the battery through the first capacitor and the battery hookup bridge arm; and
    wherein, in a negative half cycle of power supply of the battery:
    the first inductor stores energy in response to the first inductor forming a direct loop with the battery through the battery hookup bridge arm, and
    the inductor and the battery charge the second capacitor in response to the first inductor forming a loop with the second capacitor and the battery through the battery hookup bridge arm or the inductor charges the second capacitor in response to the first inductor only forming a loop with the second capacitor through the battery hookup bridge arm.

3. The PFC and DC-DC multiplexing converter of claim 2, wherein the battery hookup bridge arm comprises:
    a second diode having an anode connected to the negative direct current bus and a cathode connected to the negative electrode of the battery; and
    a fourth switching transistor having a first terminal connected to the neutral point and a second terminal connected to a node formed between the cathode of the second diode and the negative electrode of the battery.

4. The PFC and DC-DC multiplexing converter of claim 3, wherein the converter is configured such that:

in the positive half cycle of power supply of the battery, one switching transistor of the first switching transistor and the second switching transistor that has a current conduction direction the same as a current direction in the multiplexing bridge arm performs pulse width modulation to make the first inductor store energy or charge the first capacitor, and the fourth switching transistor connects the negative electrode of the battery to the neutral point; and in the negative half cycle of power supply of the battery, the third switching transistor performs pulse width modulation to make the first inductor store energy or charge the second capacitor, and the second diode connects the negative electrode of the battery to the negative direct current bus.

5. The PFC and DC-DC multiplexing converter of claim 4, wherein a first terminal of the first switching transistor is connected to a first terminal of the second switching transistor, a second terminal of the first switching transistor is connected to the second terminal of the first inductor, and a second terminal of the second switching transistor is connected to the neutral point, wherein the second switching transistor performs the pulse width modulation in the positive half cycle of power supply of the battery.

6. The PFC and DC-DC multiplexing converter of claim 2, wherein
in the multiplexing bridge arm, a second terminal of the first switching transistor is connected to a second terminal of the second switching transistor, a first terminal of the first switching transistor is connected to the second terminal of the first inductor, and a first terminal of the second switching transistor is connected to the neutral point; and the third switching transistor is replaced with a third diode, a cathode of the third diode is connected to the anode of the first diode, and an anode of the third diode is connected to the negative direct current bus.

7. The PFC and DC-DC multiplexing converter of claim 6, wherein the battery hookup bridge arm comprises:
a fifth switching transistor and a sixth switching transistor, wherein a first terminal of the fifth switching transistor is connected to a node formed between the second terminal of the first switching transistor and the second terminal of the second switching transistor, a second terminal of the fifth switching transistor is connected to the negative electrode of the battery, a first terminal of the sixth switching transistor is connected to a node between the negative electrode of the battery and the second terminal of the fifth switching transistor, and a second terminal of the sixth switching transistor is connected to the negative direct current bus.

8. The PFC and DC-DC multiplexing converter of claim 7, wherein the converter is configured such that:
in the positive half cycle of power supply of the battery, the first switching transistor performs pulse width modulation to make the first inductor store energy or charge the first capacitor, and the second switching transistor and the fifth switching transistor connect the negative electrode of the battery to the neutral point; and in the negative half cycle of power supply of the battery, the fifth switching transistor performs pulse width modulation to make the first inductor store energy or charge the second capacitor, and the sixth switching transistor connects the negative electrode of the battery to the negative direct current bus.

9. The PFC and DC-DC multiplexing converter of claim 2, wherein
in the multiplexing bridge arm, the third switching transistor is replaced with a fourth diode, a cathode of the fourth diode is connected to the anode of the first diode, and an anode of the fourth diode is connected to the negative direct current bus; and the battery hookup bridge arm comprises: a seventh switching transistor and a fifth diode, wherein
a first terminal of the seventh switching transistor is connected to the positive electrode of the battery, a second terminal of the seventh switching transistor is connected to the first inductor, the seventh switching transistor is controlled by a control terminal of the seventh switching transistor to enable a current to flow from the first terminal of the seventh switching transistor to the second terminal or to be cut off; and the seventh switching transistor is connected with a diode in reverse parallel from the first terminal to the second terminal;

a cathode of the fifth diode is connected to a node formed between the second terminal of the seventh switching transistor and the first inductor, and an anode of the fifth diode is connected to the negative direct current bus; and the negative electrode of the battery is connected to the neutral point.

10. The PFC and DC-DC multiplexing converter of claim 9, wherein the converter is configured such that:
in the positive half cycle of power supply of the battery, one switching transistor of the first switching transistor and the second switching transistor that has a current conduction direction the same as a current direction in the multiplexing bridge arm performs pulse width modulation to make the first inductor store energy or charge the first capacitor; and in the negative half cycle of power supply of the battery, the seventh switching transistor performs pulse width modulation to make the first inductor store energy or charge the second capacitor.

11. The PFC and DC-DC multiplexing converter of claim 9, wherein each of the first switching transistor to the seventh switching transistor is controlled by a control terminal of the switching transistor to enable a current to flow from the first terminal of the switching transistor to the second terminal or to be cut off; and each of the first switching transistor to the seventh switching transistor is connected with a diode in reverse parallel from the first terminal to the second terminal.

12. The PFC and DC-DC multiplexing converter of claim 9, wherein the first switching transistor to the seventh switching transistor are insulated gate bipolar transistors.

13. The PFC and DC-DC multiplexing converter of claim 9, wherein:
in response to the battery hookup bridge arm being connected to the positive electrode of the battery and being powered by the battery, the battery hookup bridge arm alternately connects the positive electrode of the battery to the neutral point and the positive direct current bus; or in response to the battery hookup bridge arm being connected to the negative electrode of the battery and being powered by the battery, the positive electrode of the battery is directly connected to the neutral point.

14. The PFC and DC-DC multiplexing converter of claim 9, wherein at least one of the first switching transistor to the seventh switching transistor is a metal-oxide-semiconductor field effect transistor or a thyristor.

15. An uninterruptible power supply, comprising:
- the PFC and DC-DC multiplexing converter of claim 9, wherein the battery is a single rechargeable battery; and
- a control module, configured to control on/off states the first switching transistor to the seventh switching transistor.

16. The uninterruptible power supply of claim 15, wherein the uninterruptible power supply is configured such that:
- in a first polarity half cycle of power supply of utility power, the multiplexing bridge arm performs power factor correction and rectification on alternating current inputted from utility power and charges a first polarity direct current bus;
- in a second polarity half cycle of power supply of utility power, the multiplexing bridge arm performs power factor correction and rectification on the alternating current inputted from utility power and charges a second polarity direct current bus;
- in a first polarity half cycle of power supply of a rechargeable single battery, the multiplexing bridge arm boosts voltage of direct current inputted from the rechargeable single battery to charge the first polarity direct current bus, and a second polarity terminal of the rechargeable single battery is in communication with the neutral point; and
- in a second polarity half cycle of power supply of the rechargeable single battery, the multiplexing bridge arm boosts voltage of the direct current inputted from the rechargeable single battery to charge the second polarity direct current bus, and the second polarity terminal of the battery is in communication with the second polarity direct current bus; or
- the second polarity terminal of the battery is communication with the neutral point in both the first polarity half cycle and the second polarity half cycle.

\* \* \* \* \*